United States Patent
Janulewicz et al.

(10) Patent No.: US 12,149,284 B2
(45) Date of Patent: Nov. 19, 2024

(54) ANALYZING PERFORMANCE OF FIBERS AND FIBER CONNECTIONS USING LONG-TERM HISTORICAL DATA

(71) Applicant: Ciena Corporation, Hanover, MD (US)

(72) Inventors: Emil Janulewicz, Ottawa (CA); Yinqing Pei, Kanata (CA); David Côté, Gatineau (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 267 days.

(21) Appl. No.: 17/198,400

(22) Filed: Mar. 11, 2021

(65) Prior Publication Data
US 2022/0294529 A1 Sep. 15, 2022

(51) Int. Cl.
*H04B 10/079* (2013.01)
*H04B 10/071* (2013.01)
(Continued)

(52) U.S. Cl.
CPC ....... *H04B 10/0795* (2013.01); *H04B 10/071* (2013.01); *H04L 41/16* (2013.01); *H04L 43/045* (2013.01); *H04L 43/06* (2013.01)

(58) Field of Classification Search
CPC ............................................ H04B 10/07–0799
(Continued)

(56) References Cited

U.S. PATENT DOCUMENTS 6,157,443 A * 12/2000 Jennings .............. H04B 10/071
356/73.1
6,498,663 B1 * 12/2002 Farhan ............. H04B 10/07953
370/514
(Continued)

FOREIGN PATENT DOCUMENTS

EP 2 993 806 A1 3/2016
WO 2002082706 A2 10/2002
(Continued)

OTHER PUBLICATIONS

Huawei Technologies Co. Ltd., "Fiber Doctor (FD)", 1 Page, 2021.
(Continued)

*Primary Examiner* — Li Liu
(74) *Attorney, Agent, or Firm* — Baratta Law PLLC; Lawrence A. Baratta, Jr.

(57) ABSTRACT

Systems, methods, and computer-readable media are provided for logging long-term data and analyzing the long-term data with short-term data to determine the health of fiber connections in an optical network. A method, according to one implementation, includes a step of obtaining data associated with performance of fiber connections of an optical network. The fiber connections include at least an inter-node fiber connecting two adjacent network nodes and an intra-node fiber connection connecting two photonic devices within each of the two adjacent network nodes. The method further includes the step of logging the data over time as historical data and then analyzing the health of the fiber connections based on the historical data and newly-obtained data. Also, the method includes displaying a report on an interactive user interface, whereby the report is configured to show the health of the fiber connections.

19 Claims, 23 Drawing Sheets

(51) Int. Cl.
*H04L 41/16* (2022.01)
*H04L 43/045* (2022.01)
*H04L 43/06* (2022.01)

(58) Field of Classification Search
USPC .................................................. 398/9–38
See application file for complete search history.

(56) References Cited

U.S. PATENT DOCUMENTS

| | | |
|---|---|---|
| 6,618,193 B1 | 9/2003 | Boertjes |
| 8,364,036 B2 | 1/2013 | Boertjes et al. |
| 8,509,618 B2 | 8/2013 | Boertjes et al. |
| 8,509,621 B2 | 8/2013 | Boertjes et al. |
| 8,554,074 B2 | 10/2013 | Boertjes et al. |
| 8,750,706 B2 | 6/2014 | Boertjes et al. |
| 8,958,696 B2 | 2/2015 | Boertjes et al. |
| 9,577,763 B2 | 2/2017 | Al Sayeed et al. |
| 9,634,791 B2 | 4/2017 | Boertjes et al. |
| 9,831,947 B2 | 11/2017 | Boertjes et al. |
| 9,973,295 B2 | 5/2018 | Al Sayeed et al. |
| 10,171,161 B1 | 1/2019 | Côté et al. |
| 10,236,981 B2 | 3/2019 | Harley et al. |
| 10,237,011 B2 | 3/2019 | Al Sayeed et al. |
| 10,277,311 B2 | 4/2019 | Archambault et al. |
| 10,404,365 B2 | 9/2019 | Frankel et al. |
| 10,536,235 B2 | 1/2020 | Al Sayeed et al. |
| 10,623,277 B2 | 4/2020 | Djukic et al. |
| 10,680,739 B2 | 6/2020 | Swinkels et al. |
| 10,715,888 B2 | 7/2020 | Swinkels et al. |
| 10,746,602 B2 | 8/2020 | Pei et al. |
| 10,784,980 B2 | 9/2020 | Roberts et al. |
| 10,784,981 B2 | 9/2020 | Boertjes et al. |
| 10,868,614 B2 | 12/2020 | Al Sayeed et al. |
| 10,887,041 B2 | 1/2021 | Boertjes et al. |
| 2003/0210908 A1* | 11/2003 | Levy ................. H04B 10/0793 398/33 |
| 2004/0218919 A1* | 11/2004 | Hunsche .......... H04B 10/07953 398/33 |
| 2008/0292314 A1* | 11/2008 | Lu .................... H04B 10/0773 398/58 |
| 2009/0226164 A1* | 9/2009 | Mayo ....................... H04J 3/14 398/25 |
| 2010/0063754 A1* | 3/2010 | Thomas ............... G01R 31/086 702/59 |
| 2011/0116791 A1* | 5/2011 | Yasuda ............... G01M 11/3145 398/21 |
| 2012/0019366 A1* | 1/2012 | Aguren ................... H04B 10/07 340/10.1 |
| 2013/0004179 A1* | 1/2013 | Nielsen .............. H04B 10/1143 398/115 |
| 2013/0051795 A1* | 2/2013 | Freiberger .......... H04J 14/0267 398/34 |
| 2014/0136139 A1* | 5/2014 | LaBonge ............... H04B 10/07 702/108 |
| 2014/0255024 A1* | 9/2014 | Frantz .................... H04B 10/07 398/25 |
| 2015/0229404 A1 | 8/2015 | Boertjes |
| 2015/0229528 A1 | 8/2015 | Swinkels et al. |
| 2015/0317197 A1* | 11/2015 | Blair .................... H04L 41/147 714/47.3 |
| 2016/0080084 A1 | 3/2016 | Boertjes et al. |
| 2016/0112119 A1* | 4/2016 | Vall-Llosera ........... H04J 14/02 398/21 |
| 2017/0230110 A1* | 8/2017 | Hurley .................. H04B 10/07 |
| 2018/0239522 A1 | 8/2018 | Campbell et al. |
| 2018/0248905 A1 | 8/2018 | Côté et al. |
| 2019/0138948 A1 | 5/2019 | Janulewicz et al. |
| 2019/0190597 A1* | 6/2019 | Kuchta ................ H04B 10/077 |
| 2019/0280942 A1 | 9/2019 | Côté et al. |
| 2019/0303726 A1* | 10/2019 | Côté ......................... G06N 3/04 |
| 2020/0082013 A1 | 3/2020 | Triplet et al. |
| 2020/0259700 A1* | 8/2020 | Bhalla ..................... G06N 20/20 |
| 2020/0259717 A1 | 8/2020 | Ong et al. |
| 2020/0313380 A1 | 10/2020 | Pei et al. |
| 2021/0028973 A1 | 1/2021 | Côté et al. |
| 2021/0050915 A1* | 2/2021 | Lee ...................... H04L 43/0823 |

FOREIGN PATENT DOCUMENTS

| | | |
|---|---|---|
| WO | 2010012100 A1 | 2/2010 |
| WO | 2018215850 A1 | 11/2018 |
| WO | 2020198574 A1 | 10/2020 |

OTHER PUBLICATIONS

Zhang et al., "Research of Fiber-optical Fault Diagnosis Based on Support Vector Machine (SVM) Mining", 2014 Fifth International Conference on Intelligent Systems Design and Engineering Applications, pp. 803-807.

* cited by examiner

|  | 80.5km FIBER (stable) | 80.5km FIBER (with kicking) | 80km FIBER (stable) |
|---|---|---|---|
| HCCS | 0 | 20 | 0 |
| PreFEC BER | 1.4E-03 | 1.5E-03 | 1.5E-03 |
| DGD-AVG | 1 | 1 | 1 |
| DGD-MAX | 4 | 4 | 4 |
| OPR-AVG-OCH | -15.4 | -15 | -14.4 |
| OPR-MAX-OCH – OPR-MIN-OCH | 0 | 0.4 | 0 |

ANALYZING PERFORMANCE OF FIBERS AND FIBER CONNECTIONS USING LONG-TERM HISTORICAL DATA

FIELD OF THE DISCLOSURE

The present disclosure generally relates to fiber optics. More particularly, the present disclosure relates to systems and methods for the analysis of performance of fibers and fiber connections of an optical network from long-term historical data and immediate data.

BACKGROUND OF THE DISCLOSURE

Optical networks are implemented with fiber optics where optical fibers are used to connect sites (e.g., Central Offices (COs), data centers, huts, repeaters, etc.) and associated Network Elements (NEs). A network element can include, for example, a fiber patch cord that connects an optical interface to a fiber distribution shelf to external fiber that physically connects the site to another site. The external fiber can include buried cable, aerial cables, and the like. Over the lifetime of operation of an optical network, various activities may occur, such as fiber cuts, fiber splices, modification of connections (fiber patch cords), environmental conditions, and other activities that can have a negative effect on the optical network and specifically the optical fiber.

All optical systems have mechanisms to monitor real-time performance metrics and raise alarms when there are fiber or fiber connection problems. Traditionally, the monitoring and alarming system for fiber and fiber connections is reactive, i.e., alarms are raised when hard-coded pass/fail criteria are not met such as threshold crossings for back reflection or threshold crossing for minimum allowed power. Many systems also focus on present day metrics, without much analysis and/or visibility into historical values.

Recently, proactive approaches are being explored and implemented. Machine Learning (ML) algorithms for predicting failure of line fibers and fiber aging mechanism are gaining interest. However, the output of the ML predictions is typically "0" or "1" for future failures without details of the reasoning available to the network operators. Furthermore, ML algorithms act as black boxes and do not readily explain the reason for prediction/classification. Without the proper reasoning, operators may struggle to deal with False Positives and waste efforts on investigating/replacing non-issue fibers. Other approaches also focus on external line fibers (i.e., external fiber between physical sites) and focusing on power monitoring and periodic Optical Time Domain Reflectometry (OTDR) readings. However, existing OTDR monitoring approaches only comparing a current OTDR trace with a baseline trace.

Conventional optical systems do not typically provide historical data and data analysis. However, historical data can be useful for understanding the potential risks of a fibers and fiber connections, and the overlaid services. Even though Performance Monitoring (PM)/alarm logging has started to be implemented, the logged data has not been utilized in conventional systems for analyzing fiber health. Also, this data is not made available for display in a user interface. However, as described in the present disclosure, historical data can be used in order to monitor trend of fiber connection performance from baseline metrics established when a fiber was first provisioned or at a user specified time.

Among the existing proactive approaches, efforts are focused on predicting future failures with ML techniques. However, most fiber issues and fiber connection issues (e.g., fiber cuts) are not predictable. That is, a fiber cut is the result of an external event that would not be predicted through ML. Even when a failure is predicted, there is usually a lack of rational reasoning provided to network operators to guide their actions to prevent the failure from happening. This lack of reasoning hampers the operators' ability to detect possible false positives.

The health of jump fibers (e.g., patch cords) within a node/shelf has been ignored in conventional systems. Since there are many more intra-NE connections than line fiber connections in an optical system, conventional techniques of monitoring only fiber spans can easily miss many types of potential problems that can occur in the optical system. Vulnerable intra-NE connections can also impact signal quality. Intra-NE connections are also more accessible and require less operational effort to remedy versus inter-NE connections. Therefore, there is a need in the field of optical networks to utilize both short-term and long-term metrics (e.g., including a fiber span between two adjacent nodes, a fiber connection between two devices within a node, fiber connectors, etc.) to allow network operators a chance to receive a comprehensive view of the health of all fibers and fiber connections in the network.

BRIEF SUMMARY OF THE DISCLOSURE

The present disclosure relates to systems and methods for the analysis of optical fiber spans and connections using both long-term historical data and immediate (current) data. The systems and methods include various techniques to monitor for proactive analysis to ensure the performance and reliability of all fiber connections in the optical network. This system can help network operators better understand the condition of fiber spans and connections in order to diagnose any issues in the network. The results of the proposed system can help the network operators to understand the health of the fibers and fiber connections of their entire network, prioritize fiber maintenance, as well as make routing/restoration decisions.

The present disclosure may be directed to systems, methods, and computer-readable media for logging long-term data, performing fiber connection analysis, and displaying analysis reports on an interactive User Interface (UI) device. A system, according to one implementation, may include a network interface arranged in communication with an optical network for obtaining data associated with performance of fibers and fiber connections. For example, the optical network may include at least an inter-node fiber connecting two adjacent network nodes and intra-node fibers connecting between photonic components within each network nodes. The system may also include an interactive user interface, a processing device, and a memory device. The memory device may be configured to store computer logic having instructions that, when executed, enable the processing device to log the data obtained by the network interface over time in the memory device as historical data. The instructions also enable the processing device to analyze the health of the fibers and fiber connections based on the historical data and immediate data newly obtained by the network interface. Finally, the instructions enable the processing device to display a report on the interactive user interface, where the report may be configured to show the health of all optical fibers and fiber connections in the network.

According to some embodiments, the optical network may include one or more fiber connections to be evaluated. The network interface may be configured to obtain the data on a periodic basis. The data may include Performance Metric (PM) data, parameters, alarms, and metadata associated with the performance of all fibers and fiber connections. In some embodiments, the instructions may further enable the processing device to determine baseline values, averages, minimums, maximums, and trends from the historical data. The processing device may further be configured to perform a risk assessment based on the health of each fiber connections and the importance of the overlaid services.

Furthermore, this system may be configured such that analyzing the health of the fibers and fiber connections may include enabling the processing device to detect one or more issues of the fibers and fiber connections and classifying the one or more issues. With the issues detected and classified, the step of displaying the report on the interactive user interface may include providing information about the health of all fibers and fiber connections to allow a user to determine a root cause of the one or more issues. The one or more issues may include one or more of threshold crossing events, slow trends over time, and recent sudden change events. The processing device may be configured to utilize a supervised Machine Learning (ML) technique to classify the one or more issues and may further utilize one or more of expert rules and labels provided by a network operator. The one or more issues of the fibers and fiber connections may include multiple issues, which may be prioritized. Also, the interactive user interface may be configured to display the multiple issues in the report to show the prioritization. Considering the detected issues and classification, the instructions may further enable the processing device to detect a severity or importance of the one or more issues based on one or more of customer priorities, Service Level Agreements (SLAs), and feedback from previous results.

BRIEF DESCRIPTION OF THE DRAWINGS

The present disclosure is illustrated and described herein with reference to the various drawings, in which like reference numbers are used to denote like system components/method steps, as appropriate, and in which:

FIG. 8B is a table showing the results of performing malicious movement on different fibers in a laboratory setting, according to various embodiments.

DETAILED DESCRIPTION OF THE DISCLOSURE

Figure 1:
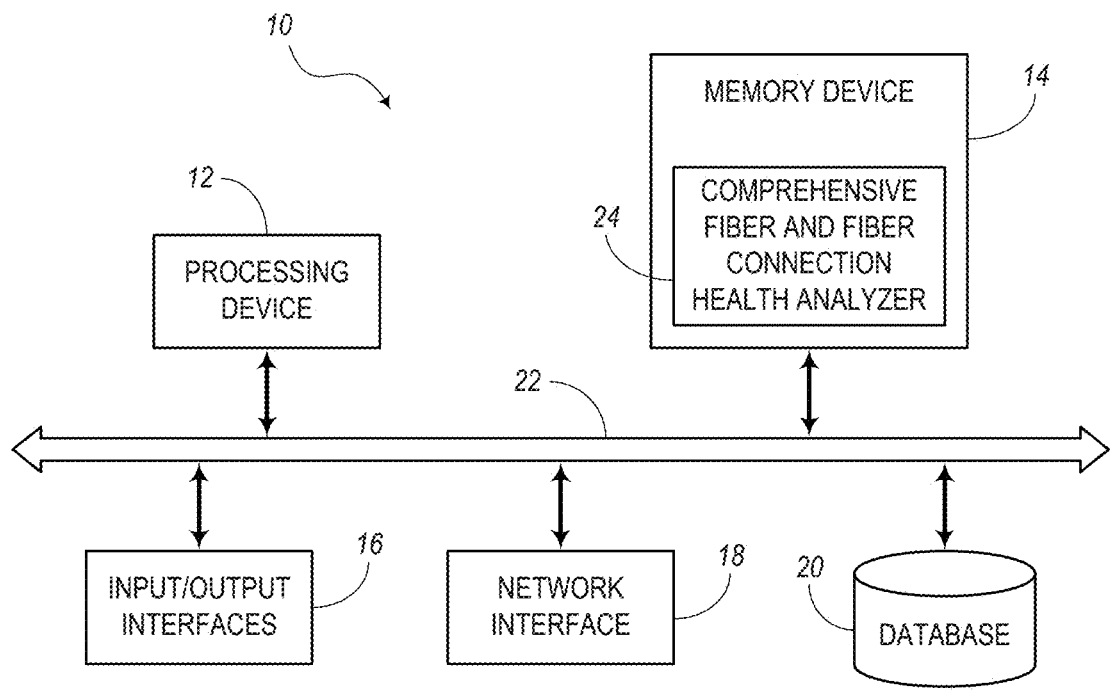
FIG. 1 is a block diagram illustrating an embodiment of a computer system that may be utilized at a Network Operations Center (NOC) for analyzing health of all fibers and fiber connections within an optical network, according to various embodiments.

In various embodiments, the present disclosure relates to systems and methods for logging long-term historical data related to all fibers and fiber connections of an optical network. For example, one optical network may include a fiber (e.g., a fiber span, a buried optical fiber line, an aerial optical fiber line, a submarine optical fiber line, etc.) that connects two adjacent network nodes. According to the present embodiments, the fiber of the optical network not only include this inter-node fibers, but it also includes the intra-node fibers. For example, the intra-node fiber may include fiber patch cords, jump fibers, connectors, optical interfaces, fiber distribution elements, etc.

Issues with fibers and fiber connections are one of the leading causes of service disruption in optical networks. Thus, there is a need to provide more visibility on the quality of the fibers and fiber connections of an optical network to a network operator associated with the optical network. When informed with problematic fibers and/or potential future issues as described in the present disclosure, network operators can easily diagnose certain issues with the Network Elements (NEs) and fiber links in order to take remedial actions before major failures happen.

However, as mentioned above, most optical networks only raise alarms at the moment when a hard-coded threshold is crossed. Thus, most conventional systems only consider a present-tense view of fiber monitoring. Hence, they are blind to long-term degradation effects. The embodiments of the present disclosure rectify these issues by providing the valuable analysis of long-term historical trends.

Some conventional fiber monitoring systems focus on long fiber links between NEs (i.e., inter-NE links). Although there is value in detecting issues with inter-NE links, the embodiments of the present disclosure are further configured to detect issues with "intra-NE" fibers and fiber connections within each of the two adjacent NEs (or nodes) connected via the inter-NE links. The intra-NE fibers and fiber connections may include connectors, ports, fiber patch cords, jump fibers, fiber interfaces, fiber distribution components, and other optical fiber connection components. It should be noted that monitoring intra-NE fibers and fiber connections, which are arranged between devices within a NE, may be equally as important as the monitoring of other components (e.g., inter-NE fiber), which will also help ensure the quality and reliability of optical signal transmission.

Finally, predictive approaches have started to attract more interests in the field of optical networks. However, since it may be difficult for conventional systems to accurately predict certain future fiber connection failures (e.g., unexpected fiber cuts), it may be more effective (and more beneficial to network operators) to provide a report based on a comprehensive historical data analysis to help the network operators to understand the risks of the vulnerable connections and to make operational decisions on their own terms.

Thus, the present disclosure provides a comprehensive fiber connection monitoring and analysis system for the entire optical network, including both the inter-NE and intra-NE fiber connections. According to the implementations of data analysis procedures described in the present disclosure, the performance of fibers and fiber connections can be evaluated. From the evaluations detected over time, vulnerable fibers and fiber connections can be identified, classified, and rated. The embodiments of the present disclosure are configured to report the results of the analysis of the health of fibers and fiber connections for both immediate issues (e.g., fiber pinch condition, etc.) and long-term issues (e.g., accumulation of bad splices over time, etc.). Users (e.g., network operators at Network Operations Centers (NOCs), data centers, etc.) will be able to review the summary of health of fibers and fiber connections of the entire network to understand the quality of each of the fiber components in their network. For example, the reports may be displayed on an interactive user interface (e.g., graphical user interface) in order to enable the user to sort or group different criteria as he or she wishes. This may allow the user to rank and evaluate the risk of the vulnerable connections on their own terms and prioritize potential issues and remedial actions.

The present disclosure may be configured to utilize Machine Learning (ML) to detect and analyze various metrics of the optical network over time. In some embodiments, the systems and methods may include a supervised ML technique where a ML model can be trained using expert rules, labels, classifications, and other input from an expert (e.g., network operator). The operator feedback collected through ticketing systems may be used to label the different classes of fiber issues. In principle, with enough feedback/labels, a supervised ML approach could be utilized to classify the different classes of problematic fibers. With the addition of cross-layer topology information, it is possible to compare fiber loss degradation with optical margins at receiver Optical Channel Laser Detector (OCLD) cards (and their overlaid services). This enables precise risk assessment and state-of-the-art service assurance, taking into account the type of fiber issues and the optical margins available.

The systems and methods for monitoring the health of fibers and fiber connections thereby provide a tool for alerting the network operator of various conditions and allowing the network operator to be proactive with respect to potential fiber issues. Furthermore, the results of the systems and methods can help the network operators understand the health of the fibers, fiber connections, etc. of their entire network, prioritize the maintenance of the fibers and fiber connections as needed, and make routing/restoration decisions.

Network Operations Center (NOC)

FIG. 1 is a block diagram illustrating an embodiment of a computer system 10 that may be utilized at a Network Operations Center (NOC) for analyzing fibers and fiber components of an optical network within an optical network. In the illustrated embodiment, the computer system 10 may be a digital computer that, in terms of hardware architecture, generally includes a processing device 12, a memory device 14, Input/Output (I/O) interfaces 16, a network interface 18, and a database 20. The memory device 14 may include a data store, database (e.g., database 20), or the like. It should be appreciated by those of ordinary skill in the art that FIG. 1 depicts the computer system 10 in a simplified manner, where practical embodiments may include additional components and suitably configured processing logic to support known or conventional operating features that are not described in detail herein. The components (i.e., 12, 14, 16, 18, 20) are communicatively coupled via a local interface 22. The local interface 22 may be, for example, but not limited to, one or more buses or other wired or wireless connections. The local interface 22 may have additional elements, which are omitted for simplicity, such as controllers, buffers, caches, drivers, repeaters, receivers, among other elements, to enable communications. Further, the local interface 22 may include address, control, and/or data connections to enable appropriate communications among the components 12, 14, 16, 18, 20.

The processing device 12 is a hardware device adapted for at least executing software instructions. The processing device 12 may be any custom made or commercially available processor, a Central Processing Unit (CPU), an auxiliary processor among several processors associated with the computer system 10, a semiconductor-based microprocessor (in the form of a microchip or chip set), or generally any device for executing software instructions. When the computer system 10 is in operation, the processing device 12 may be configured to execute software stored within the memory device 14, to communicate data to and from the memory device 14, and to generally control operations of the computer system 10 pursuant to the software instructions.

It will be appreciated that some embodiments of the processing device 12 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 12 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 16 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 18 may be used to enable the computer system 10 to communicate over a network, such as an optical network, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10GbE) or a Wireless LAN (WLAN) card or adapter (e.g., 802.11a/b/g/n/ac). The network interface 18 may include address, control, and/or data connections to enable appropriate communications on the network.

The memory device 14 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 14 may incorporate electronic, magnetic, optical, and/or other types of storage media. The memory device 14 may have a distributed architecture, where various components are situated remotely from one another, but can be accessed by the processing device 12. The software in memory device 14 may include one or more software programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 14 may include a data store used to store data. In one example, the data store may be located internal to the computer system 10 and may include, for example, an internal hard drive connected to the local interface 22 in the computer system 10. Additionally, in another embodiment, the data store may be located external to the computer system 10 and may include, for example, an external hard drive connected to the Input/Output (I/O) interfaces 16 (e.g., SCSI or USB connection). In a further embodiment, the data store may be connected to the computer system 10 through a network and may include, for example, a network attached file server.

Moreover, some embodiments may include a non-transitory computer-readable storage medium having computer readable code stored in the memory device 14 for programming the computer system 10 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 12 that, in response to such execution, cause the processing device 12 to perform a set of operations, steps, methods, processes, algorithms, functions, techniques, etc. as described herein for the various embodiments.

The computer system 10 may further include a comprehensive fibers and fiber connections health analyzer 24, which may be implemented in hardware, software, firmware, or any combination thereof. As illustrated, the comprehensive fiber and fiber connection health analyzer 24 may implemented as software and/or firmware and stored in the memory device 14 or other non-transitory computer-readable media. The comprehensive fiber and fiber connection health analyzer 24 may include computer logic having instructions that, when executed, enable the processing device 12 to perform certain logic functions.

Figure 2:
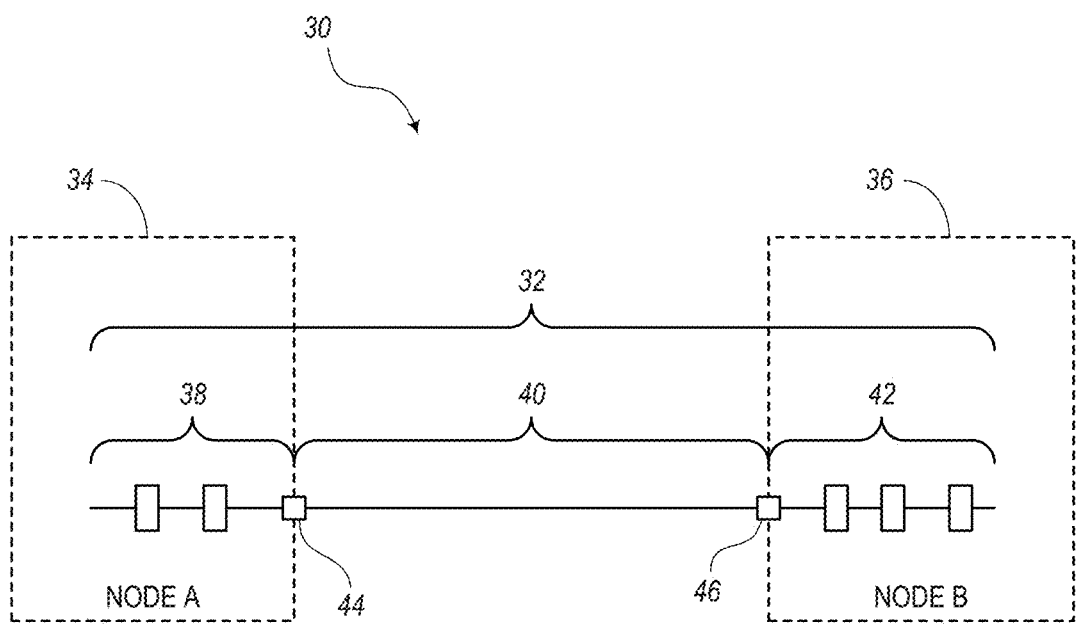
FIG. 2 is a diagram illustrating an example of fibers and fiber connections in an optical network including both inter-NE fiber and fiber connection and intra-NE fiber and fiber connection, according to various embodiments.

FIG. 2 is a diagram illustrating an embodiment of a portion of a network 30 having multiple fibers and fiber connections in a portion of an optical network 32 extending from a first node 34 (NODE A) to a second node 36 (NODE B) operating in the network 30. The fibers and fiber connections in the portion of an optical network 32 may include intra-node fiber elements 38 of the first node 34, an inter-node fiber span 40 connected the first and second nodes 34, 36 together, and intra-node fiber elements 42 of the second node 36. In addition, the fibers and fiber connections in the portion of an optical network 32 further include a first fiber connection 44 (or connector) that connects the first node 34 with the inter-node fiber span 40 and a second fiber connection 46 (or connector) that connects the inter-node fiber span 40 with the second node 42.

The network interface 18 shown in FIG. 1 is configured to communicate with the first and second nodes 34, 36 to obtain Performance Monitoring (PM) parameters and alarms related to performance the fibers and fiber connections 30. Then, the comprehensive fiber and fiber connection health analyzer 24 shown in FIG. 1 is configured to allow the processing device 12 to log the PM parameters and alarms in the memory device 14 and/or database 20. Also, the processing device 12 may be configured to analyze the PM parameters and alarms to derive additional variables that may be used to detect or classify various fiber issues. For example, root causes of various fiber issues of the fibers and fiber connections 30 can be defined ahead of time. As such, the processing device 12 can compare the PM parameters and other derived variables of currently measured PM parameters with historical data to determine short-term and long-term issues. This information can then be presented on an I/O interface 16, such as a User Interface (UI), Graphical User Interface (GUI), or the like.

Root Causes

Different fiber problems may be exposed as a result of various root causes. Root causes can be defined as instantaneous (or short-term) issues and long-term issues. An example of some instantaneous issues includes a) fiber cuts, b) dirty fibers, c) dirty connectors, d) loosely connected fiber, e) pinched, bent, or kinked fibers, f) fibers being physically moved, g) fiber being intruded or tapped, and others. An example of some long-term issues includes: a) bad fiber repairs (e.g., "splicing"), b) manufacturing defects, c) abnormal fiber aging, d) addition of new malicious fibers, e) addition of multiple issues over time (e.g., multiple splices), and others. These different root causes tend to produce different data patterns, as can be seen with respect to FIGS. 3-9. The comprehensive fiber and fiber connection health analyzer 24 may be driven by a combination of short-term and long-term data to detect and classify fiber issues.

As described with respect to FIGS. 3-9, the embodiments of the present disclosure may be applicable to four different categories of use-cases. The four use-cases may include:
1) detecting a sudden Loss of Signal (LOS), such as a fiber cut, un-expected disconnection of fiber, etc.;
2) determining if fiber is being physically moved or stressed;
3) detecting long-term fiber degradation; and
4) detecting fiber intrusion, such as, adding additional fiber, performing a fiber-tapping procedure (e.g., "micro bending," etc.).

Detecting LOS may be a relatively easy diagnosis. Determining when a fiber is physically moved or stressed may be include a medium difficulty diagnosis. Detecting long-term fiber degradation may use software for predicting the health of the network, which may include a relatively easy diagnosis. The fiber-tapping procedure may be a state-of-the-art procedure and may be relatively more difficult to execute.

Figure 3A:
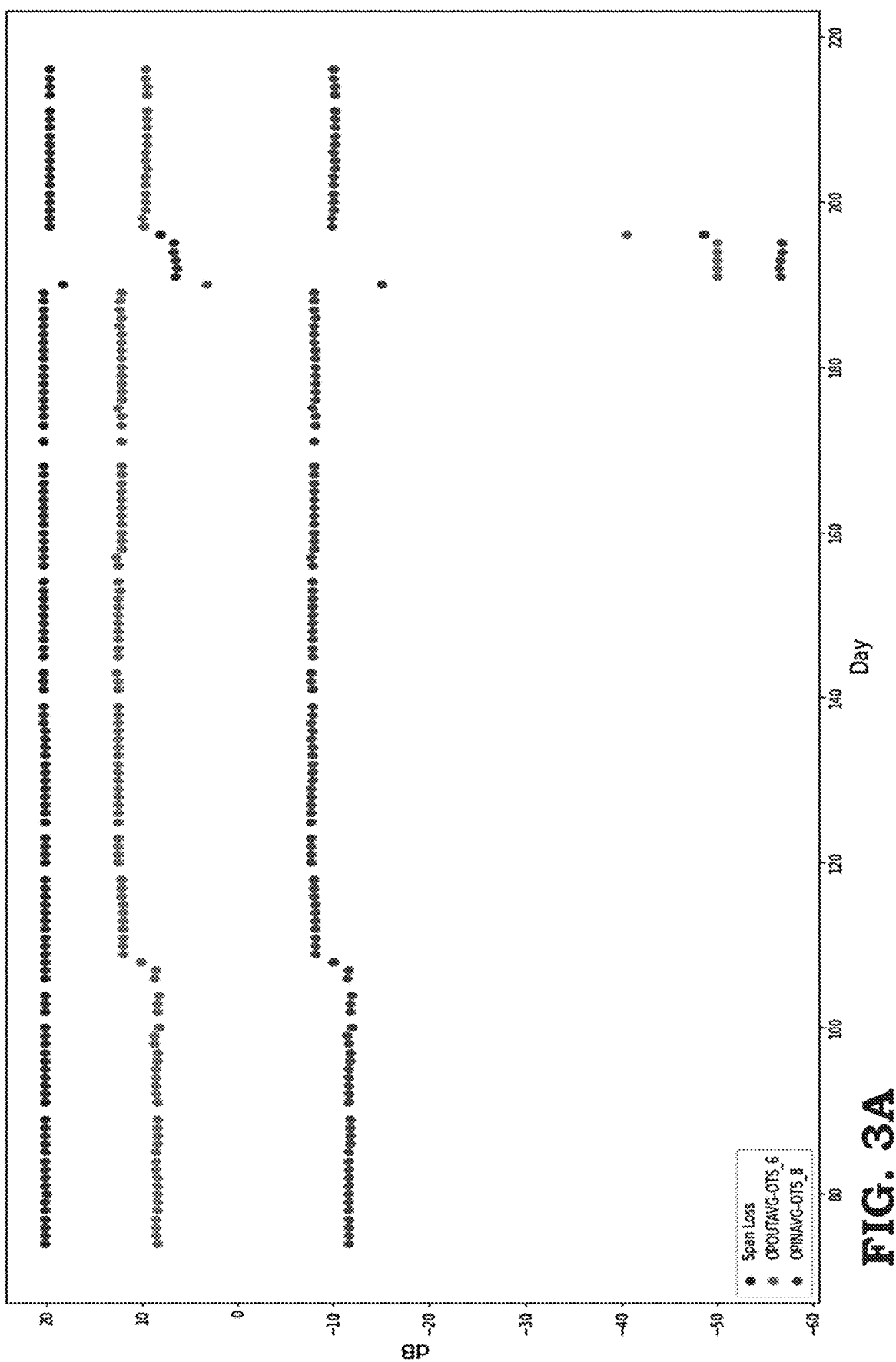
FIG. 3A is a graph showing data obtained from an example of daily average span loss performance over time, which is one of the metrics analyzed for health of fibers and fiber connections, according to various embodiments.

FIG. 3A is a graph showing data obtained from an example of over time span loss performance of an inter-NE fiber. The graph of FIG. 3A shows an example of a first use-case for analyzing a sudden Loss of Signal (LOS). In FIG. 3A, OPOUTAVG-OTS_6 is the daily average input power of an inter-NE fiber span reported by the transmit amplifier at upstream, OPINAVG-OTS_8 is the daily average output power of the same inter-NE fiber span reported by the receiver amplifier at downstream. Span loss is calculated by the difference between the input power (OPOUTAVG-OTS_6) and output power (OPINAVG-OTS_8) of the fiber span. For a fiber cut event, in addition to being recorded by PM's, a receiver amplifier of the problematic fiber span may raise an "optical line failure" flag and automatically shut off. Both the PM's and the alarms can be used as the signature of a fiber cut event.

Figure 3B:
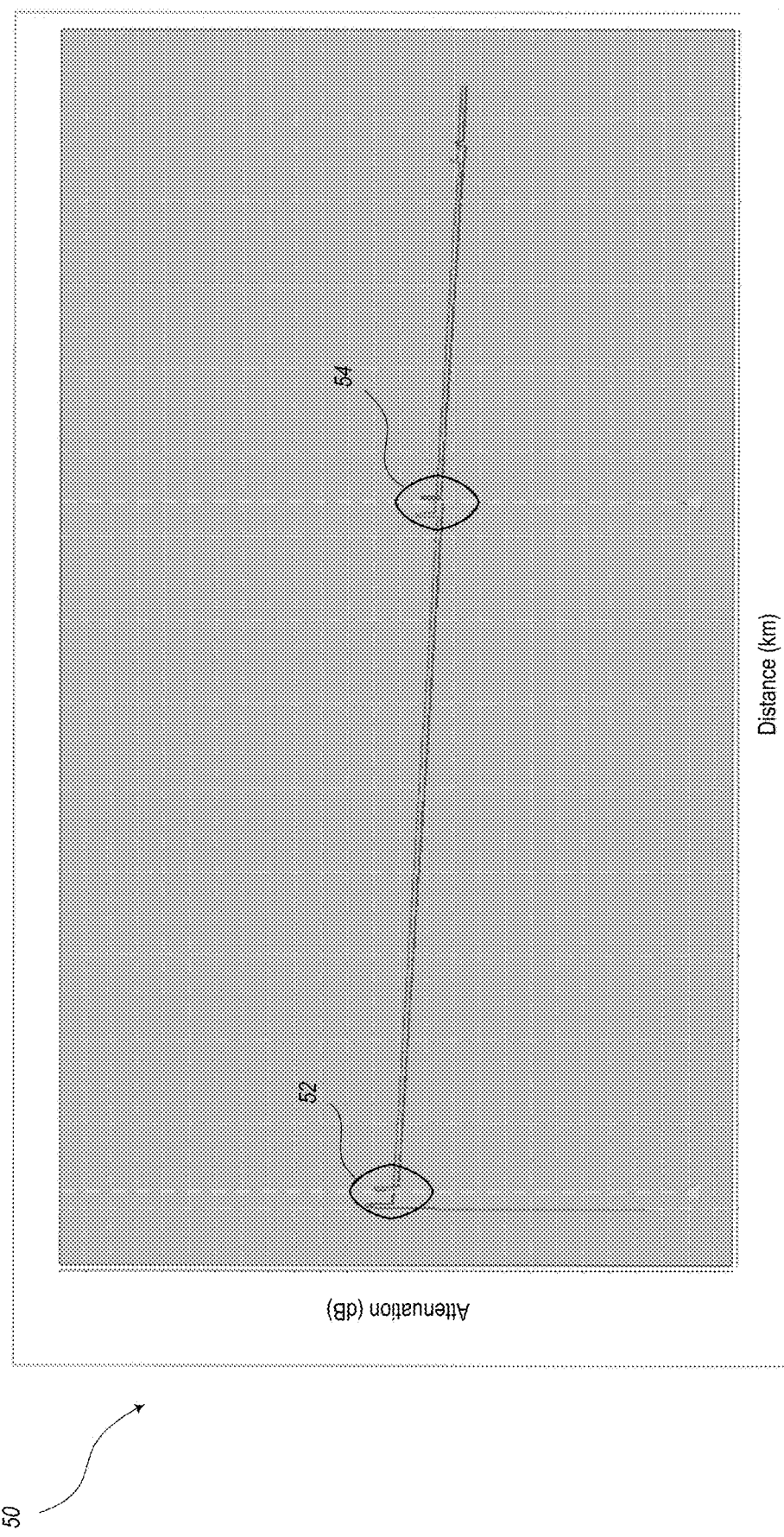
FIG. 3B shows a graph of a first use-case with Optical Time-Domain Reflectometry (OTDR) measurements performed in a lab environment, according to various embodiments.

FIG. 3B shows a graph 50 of the first use-case with Optical Time-Domain Reflectometry (OTDR) measurements performed in a lab environment. With the additional 550 meters of additional fiber, a clean signature with may be obtained before and after. A first event 52 shows the visible effect of adding 500 meters, which may be detected by standard OTDR. A second event 54 shows a reflection evented detected by standard OTDR, where the distance is moved from 20.536 km to 21.046 km. The second event 54 includes a clean signature that the additional fiber was added in the path.

In order to detect additional fiber in a fiber span when OTDR measurement (graph 50) is not available, combination of Optical Supervisory Channel (OSC) delay measurements, Optical-channel Data Unit (ODU) delay measurements, and Optical Power Received (OPR) variation can also be used. However, there may be measurement error or ambiguity with respect to interpreting the measurement data from different sources. In some cases, it may be better to combine all available inputs in a ML classifier trained specifically for this use-case.

Figure 3C:
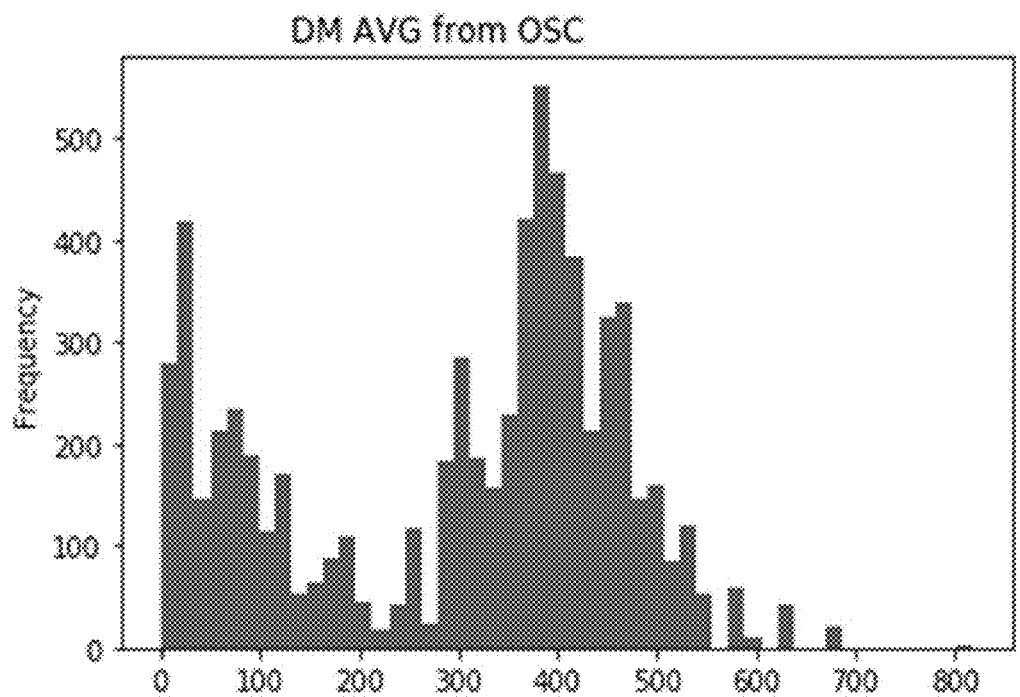
FIG. 3C shows the Delay Measurement (DM) average from an Optical Supervisory Channel (OSC) in the network, according to various embodiments.
Figure 3D:
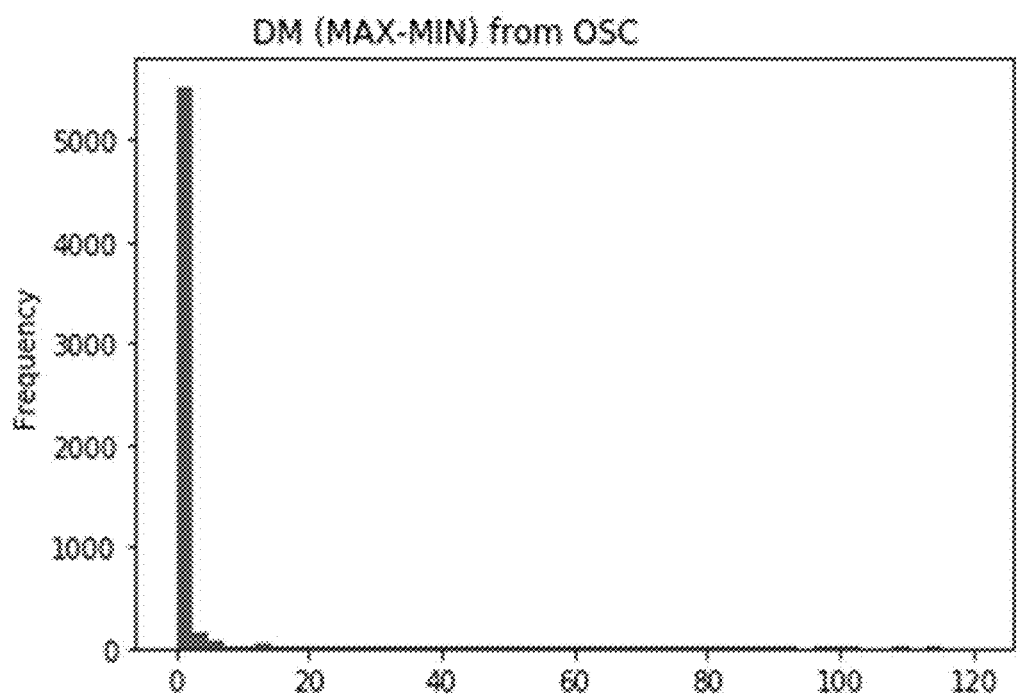
FIG. 3D shows the DM maximum—minimum from OSC in the network, according to various embodiments.
Figure 3E:
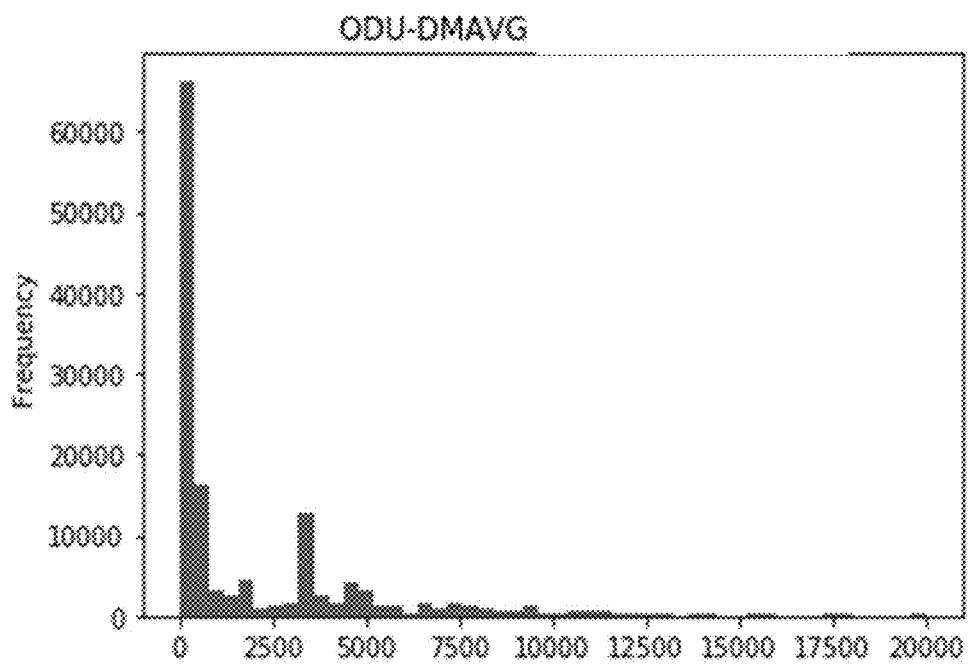
FIG. 3E shows the ODU DM average in the network, according to various embodiments.
Figure 3F:
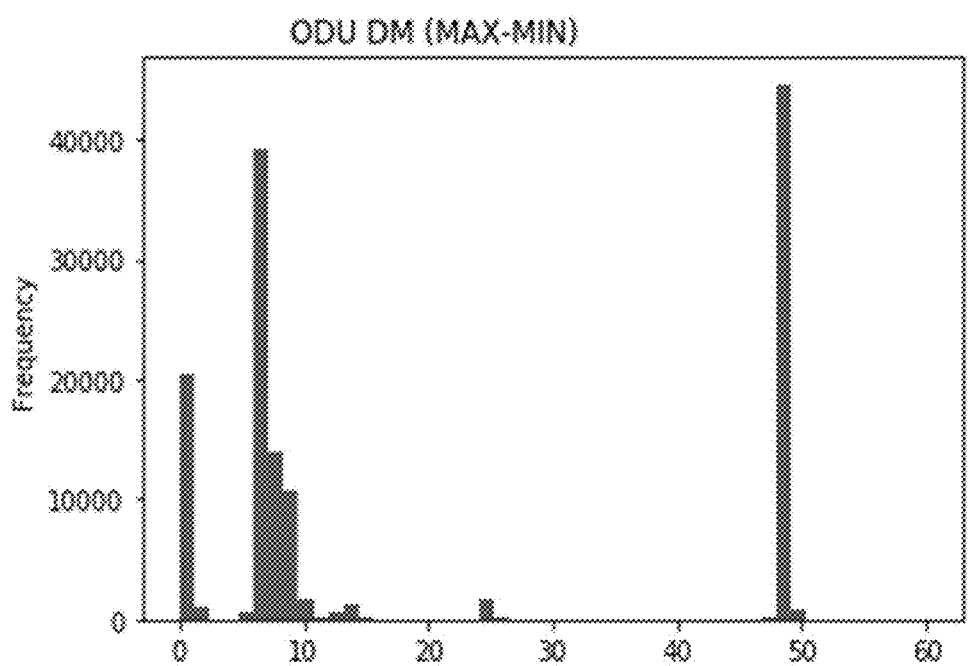
FIG. 3F shows the ODU DM maximum—minimum in the network, according to various embodiments.

FIGS. 3C-3F show the first use-case with a standard software program for predicting the health of a network for an example customer. The graphs show frequency versus time. OSC and ODU delay measurements may be collected and analyzed immediately. However, variations of DM can be caused by various effects. The computer system 10 may train and use a customized ML model to determine classifications among them. FIG. 3C shows the DM average from OSC in the network. FIG. 3D shows the DM maximum—minimum from OSC in the network. FIG. 3E shows the ODU DM average in the network. Also, FIG. 3F shows the ODU DM maximum—minimum in the network.

Figure 4A:
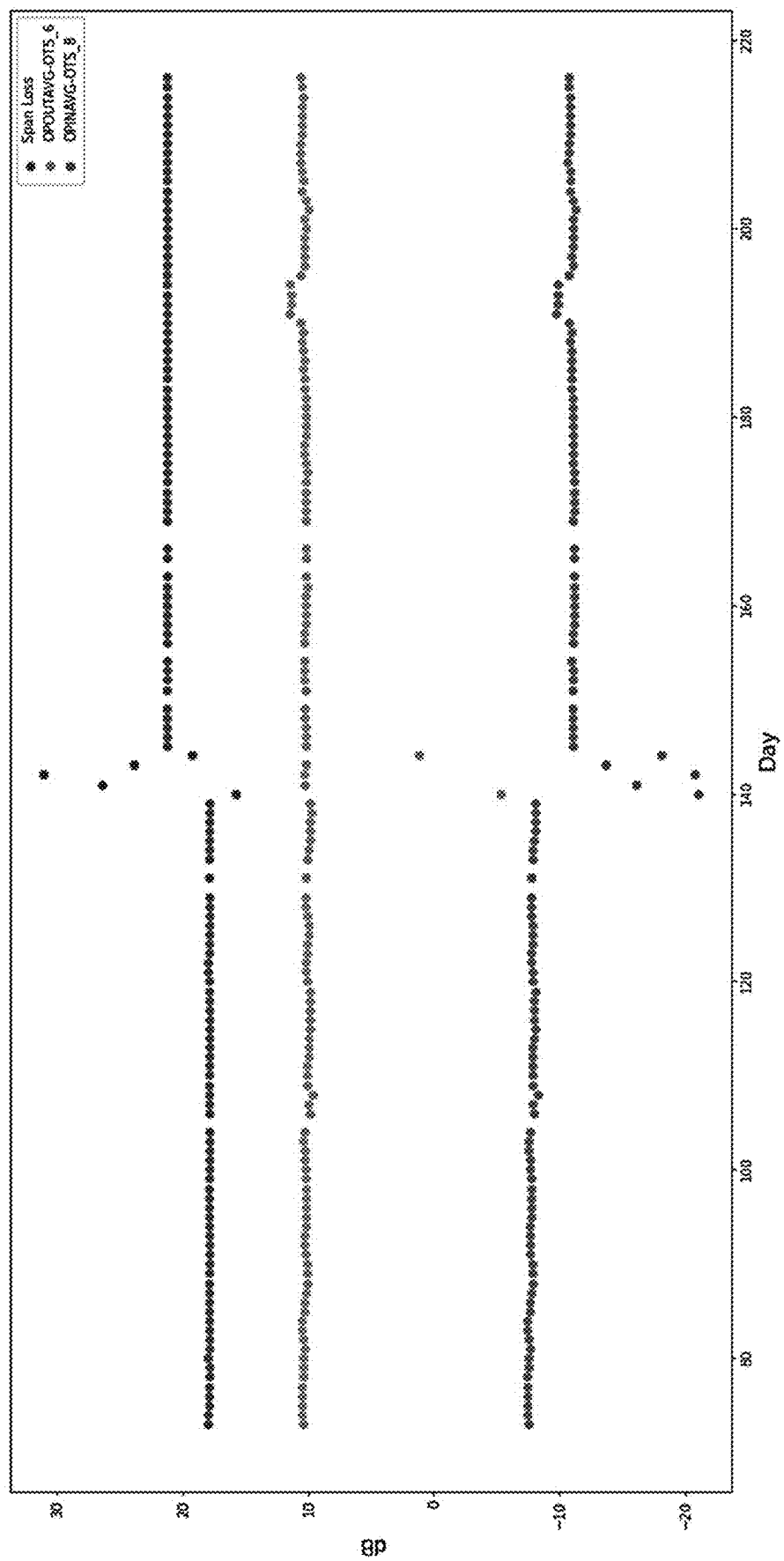
FIG. 4A is a graph showing another use-case where there is a sudden fluctuation followed by an increase in span loss, which may be the result of a fiber disconnection or fiber cut event, which was not re-connected or fixed properly, according to various embodiments.

FIG. 4A is a graph showing another use-case where there is an increase in span loss after a sudden fluctuation, which may be the result of a fiber disconnection or fiber cut event, which was not re-connected or fixed properly. In this case, a baseline may be calculated and span loss may be monitored overtime and compared with the baseline to determine a severity based on the difference. The difference may be calculated as a delta of 0.5 dB, 1 dB, 2 dB, etc.

The use-case of FIG. 4A may also apply to a a defect from splicing, a loosely connected fiber, or other condition where the attenuation may be very high. An Optical Return Loss (ORL), in which a higher value indicates better performance. Also, this use-case may be related to a dirty fiber or dirty connector. In the case of a dirty fiber or connector, an ORL may be very low (e.g., below 17 dB). Furthermore, this use-case may apply to a situation where the fiber is pinched, bent, or kinked, which can be presented in the graph.

The PM parameters measured from the network may include DGDMAX, DGDAVG, SPANLOSS, ORL, Tx/Rx for Spans (topology), PRFBER, QAVG, QSTD. From this data, OSC span loss may be calculated, which, according to some embodiments, may not simply be the calculation of a difference.

Figure 4B:
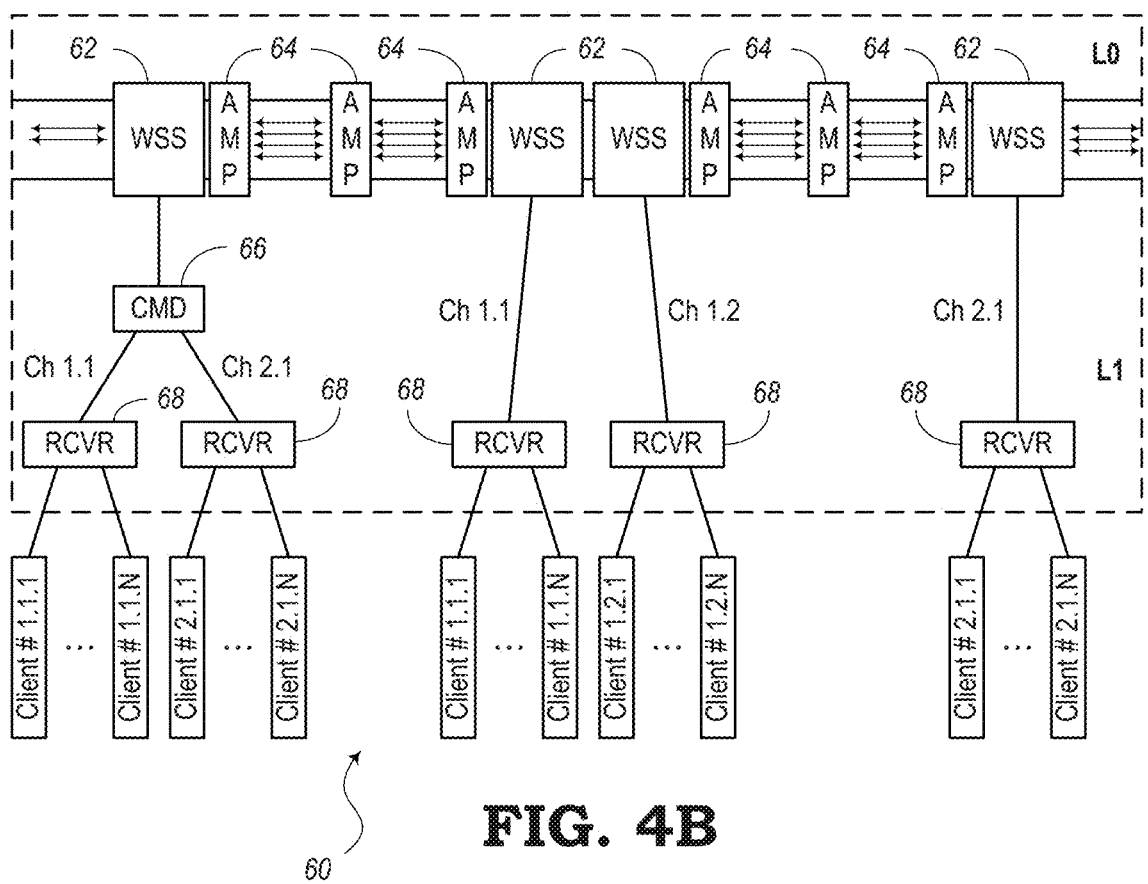
FIG. 4B is a diagram of an optical network that may be configured for analysis in the use-case of FIG. 4A, according to various embodiments.

FIG. 4B is an optical network 60 that may be configured for analysis in the use-case of FIG. 4A. The graph of FIG. 4A may also apply to representation on a display that may be viewed for diagnosing an aged fiber, a moved fiber (e.g., environmental factors), or other characteristics of a fiber in the optical network 60. In this example, the optical network 60 may include a number of Wavelength Selective Switching (WSS) devices 62, amplifiers 64, a Channel Multiplexer/Demultiplexer (CMD) device 66 and a number of Optical Channel Laser Detectors (OCLDs) 68 in a Layer 0. The OCLD 68 may be connected with a plurality of user or client devices in a Layer 1 and above. Data may be obtained for monitoring fiber and fiber connection performance, including power/loss related parameters, polarization related parameters, delay related parameters and periodic OTDR traces.

Figure 5:
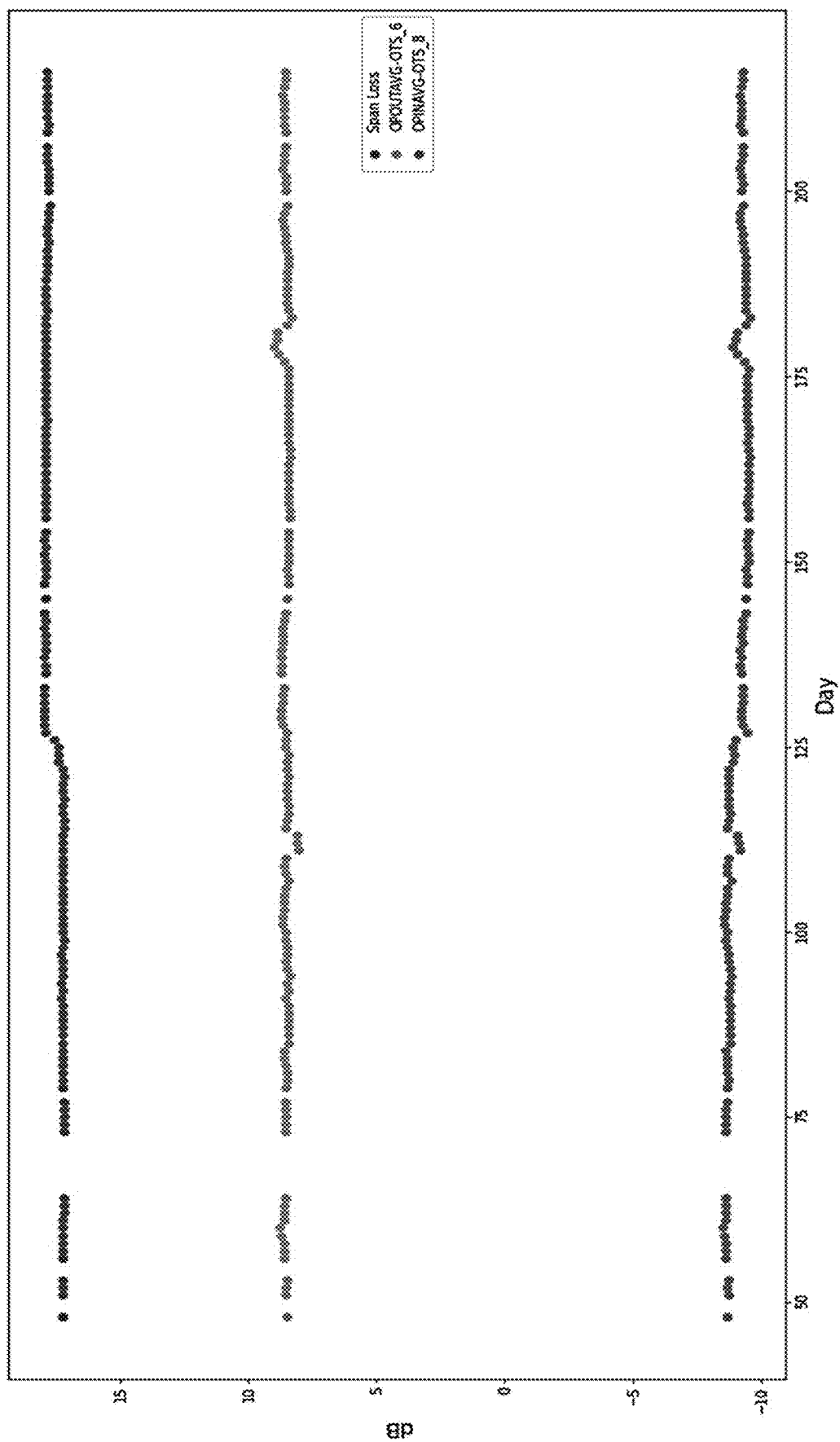
FIG. 5 is a graph showing a slight increase in a span loss without sudden activity, according to various embodiments.
Figure 6:
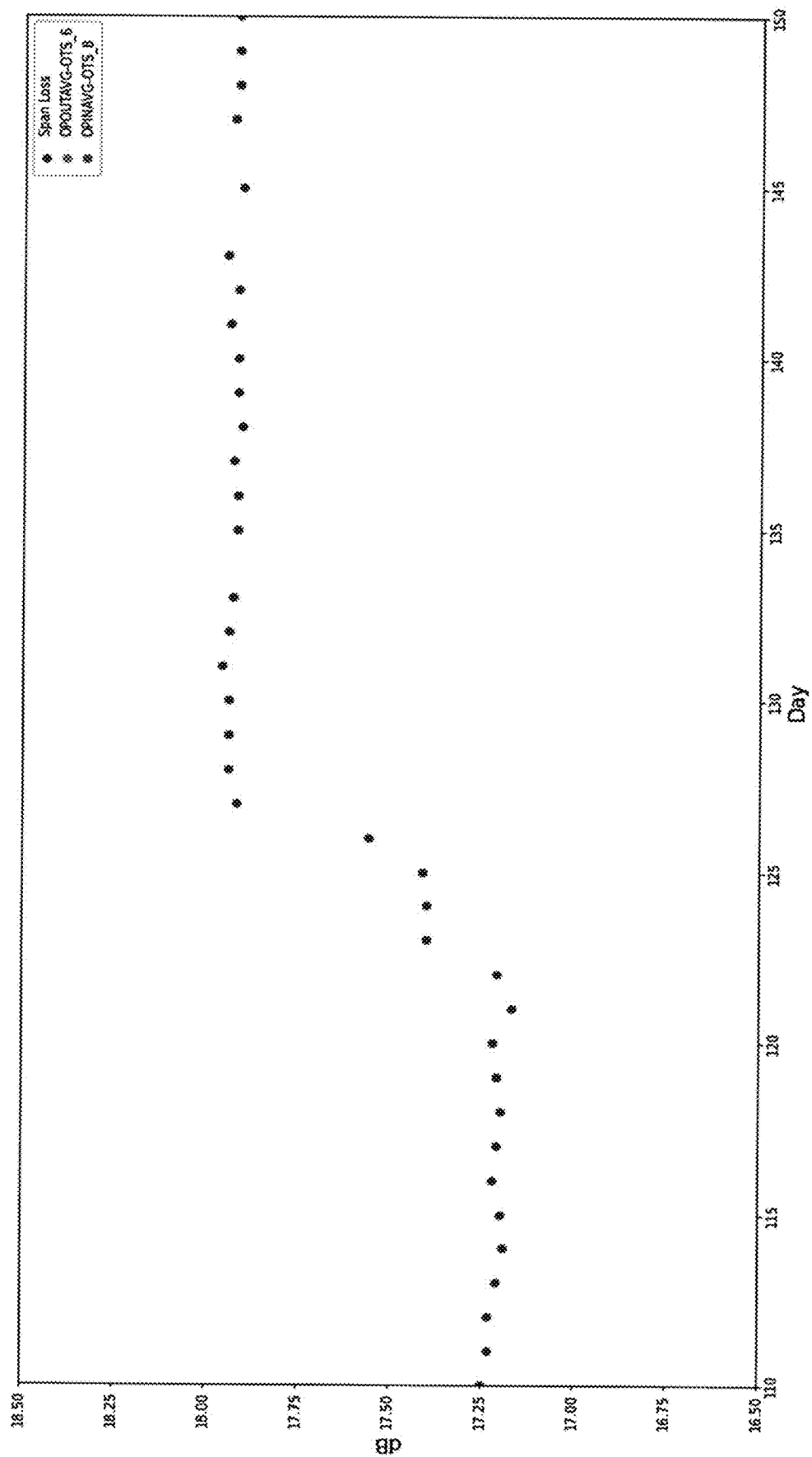
FIG. 6 is the zoom-in view of FIG. 5 showing the span loss performance, according to various embodiments.
Figure 7:
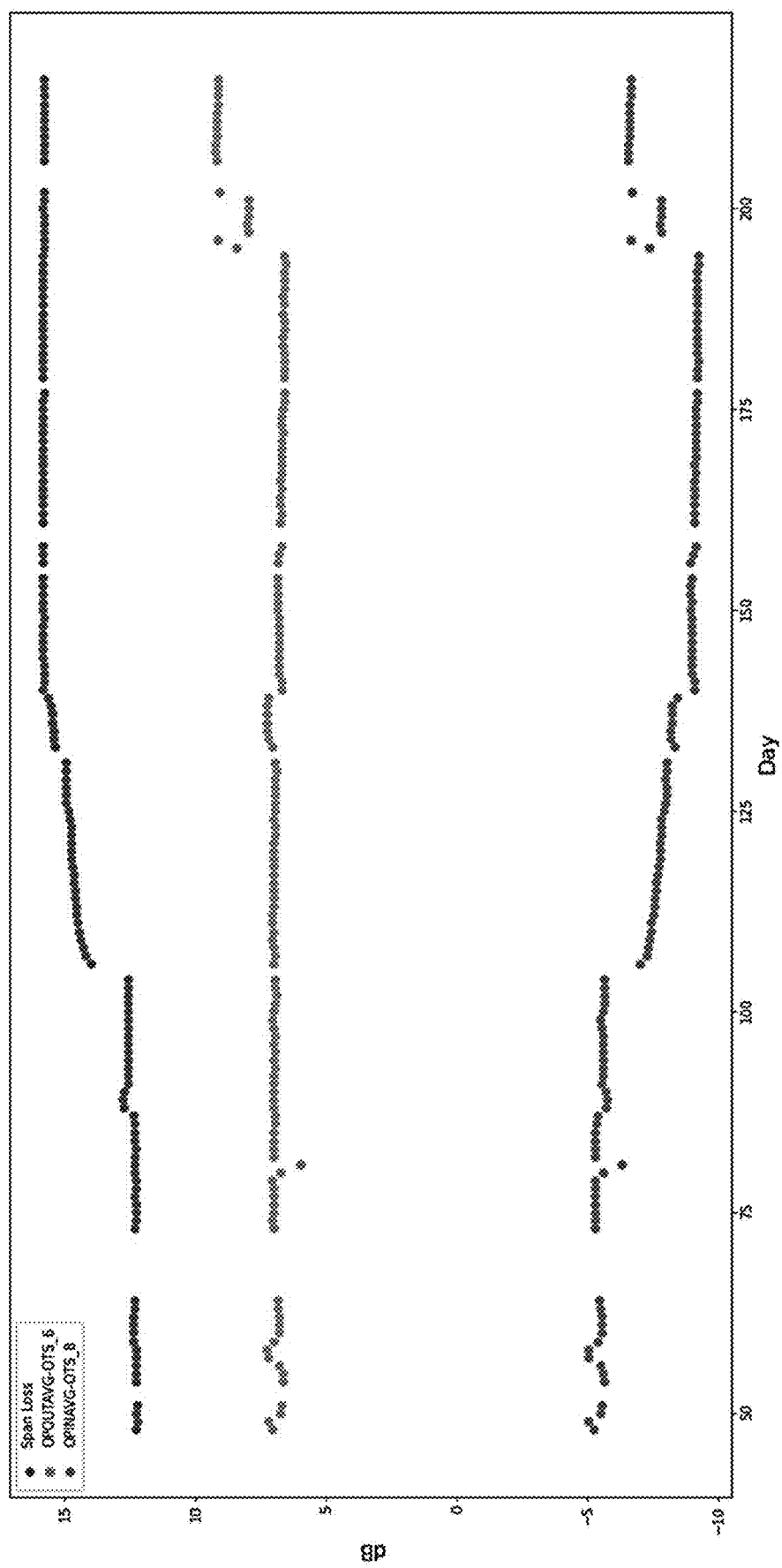
FIG. 7 is a graph showing a detectable trend in the span loss, according to various embodiments.

FIGS. 5-7 show graphs according to another use-case. FIG. 5 is a graph showing a slight increase in a span loss. For example, this may be the result of a slight moved or stressed fiber. FIG. 6 is the zoomed in of the span loss trace of FIG. 5. FIG. 7 is a graph showing a detectable trend in the span loss after being discontinued for a day at day 105. This may be the result of the fiber not being connected or spliced properly after day 105, for example.

Figure 8A:
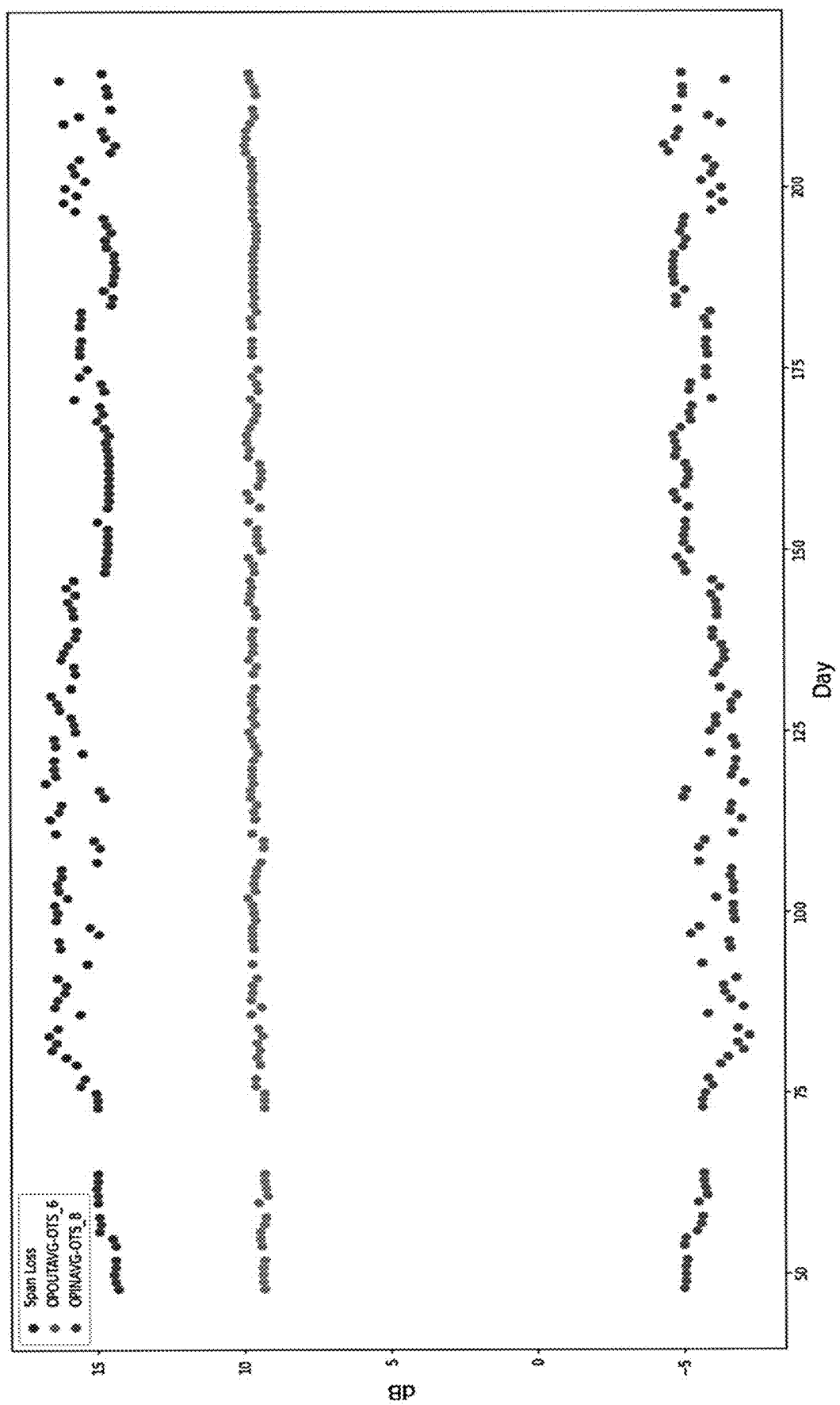
FIG. 8A is a graph showing long-term instability according to another use-case, according to various embodiments.

FIG. 8A is a graph showing long-term instability according to another use-case. For example, the monitored results may show the results of a root-cause where an aerial fiber is physically moved. The graph of FIG. 8 can be viewed to detect that physical movement of a fiber has occurred. A challenge in this respect, however, is that it may be difficult to differentiate between normal movement and malicious movement. In some embodiments, the computer system 10 may be configured to train and use a dedicated ML model for differentiating between normal and malicious movement.

FIG. 8B is a table showing the results of performing malicious movement on (e.g., by physically kicking) different fibers in a laboratory setting. In this example, it is shown that physical movement of the fiber can be detectable.

Figure 8C:
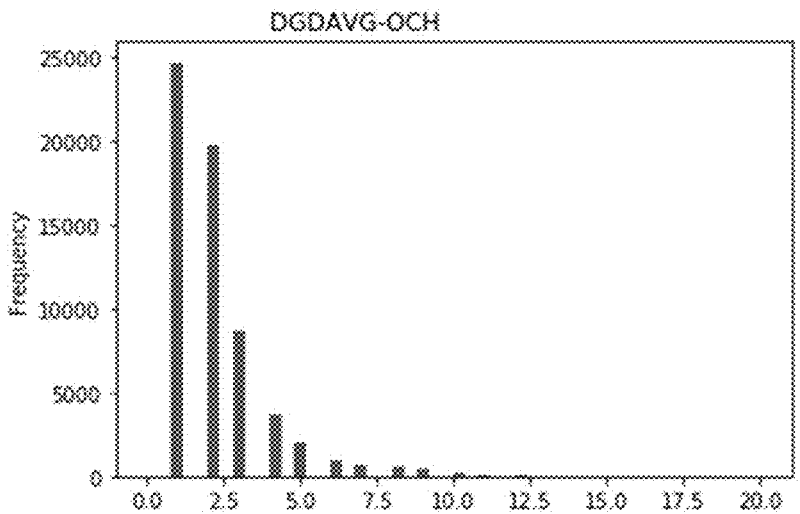
FIG. 8C shows the DGD average—OCH in the network, according to various embodiments.
Figure 8D:
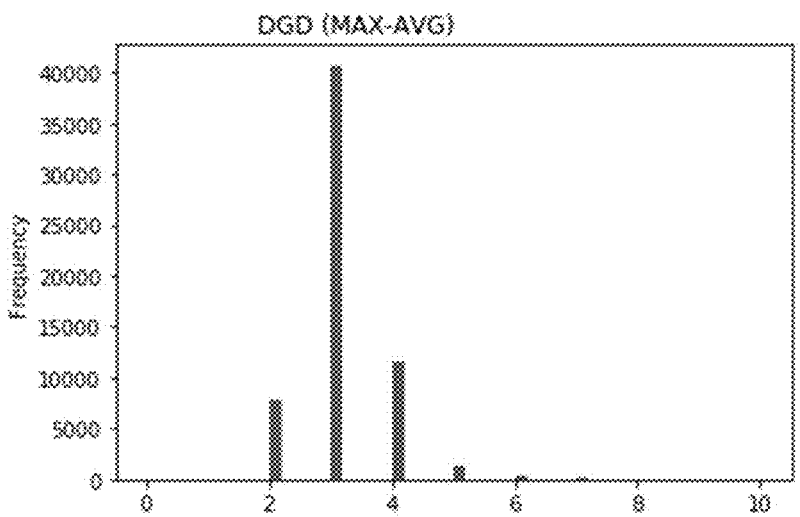
FIG. 8D shows the DGD maximum—minimum in the network, according to various embodiments.
Figure 8E:
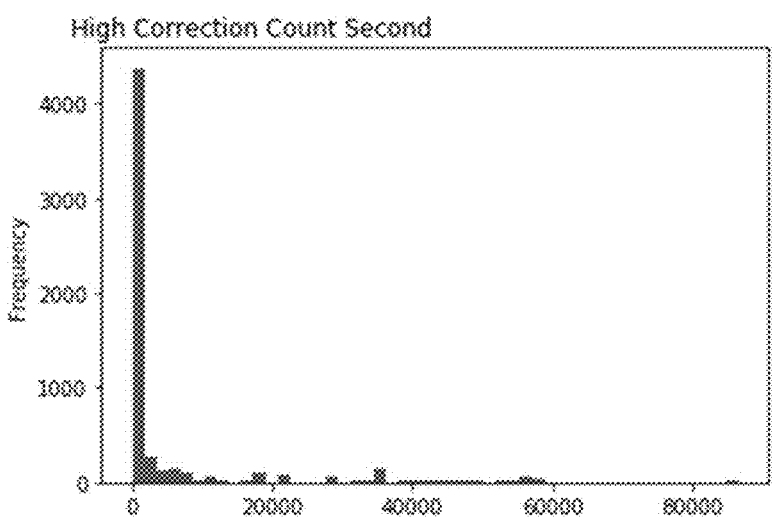
FIG. 8E shows the high correction count seconds from the network, according to various embodiments.

FIGS. 8C-8E are graphs showing measurement of frequency versus time for an example network. FIG. 8C shows the DGD average—OCH in the network. FIG. 8D shows the DGD maximum—minimum in the network. Also, FIG. 8E shows the high correction count seconds from the network.

Figure 9A:
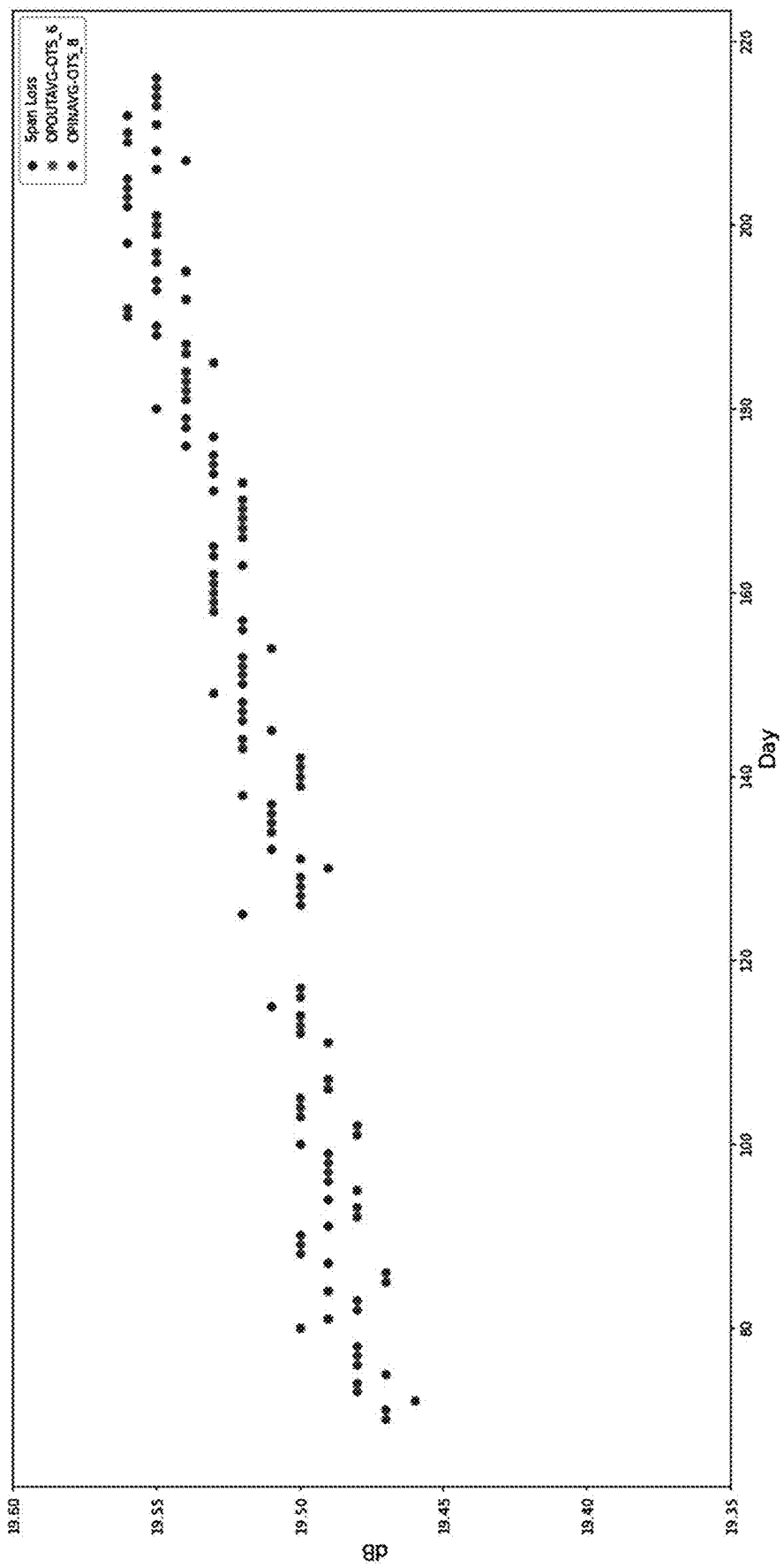
FIG. 9A is a graph showing an example of data obtained from a network to demonstrate another use-case, according to various embodiments.

FIG. 9A is a graph showing an example of data obtained from a network to demonstrate another use-case. In this example, a trending span loss may be detected by viewing the results. For example, the trending span loss may be a sign of a slow linear degradation of a fiber (e.g., fiber aging) or a long-term fiber degradation pattern.

Various PM parameters or metrics may be detected at various points in the network for analysis of the fibers and fiber connections 30 of an optical network. For example, fiber loss metrics may be obtained by measuring total optical power at various ports in the network, measuring OSC span loss, and/or measuring other span losses. Various fibers may have different fiber types, such as NDSF, TWC, TWP, ELEAF, LS, TWRS, LEAF, TERALIGHT, etc.

Another additional use-case may include fiber tapping. For example, fiber tapping detection can be done with a combination of precise OTDR and advanced analytics, as suggested in M. Zafar Iqbal et al., *Optical Fiber Tapping: Methods and Precautions*. However, this use-case may require dedicated lab study and partnership with the client to define what specific tapping methods need to be tested.

The continuous and period monitoring of PM metrics, alarms, metadata, etc. of the optical network 32 includes detecting the characteristics and conditions of the fibers and fiber connections 30, which include the inter-node fibers and fiber connections and intra-node fibers and fiber connections. In some situations, OTDR traces may be run on a periodic basis to detect and localize change over inter-NE fibers and to monitor fiber loss degradation.

Figure 9B:
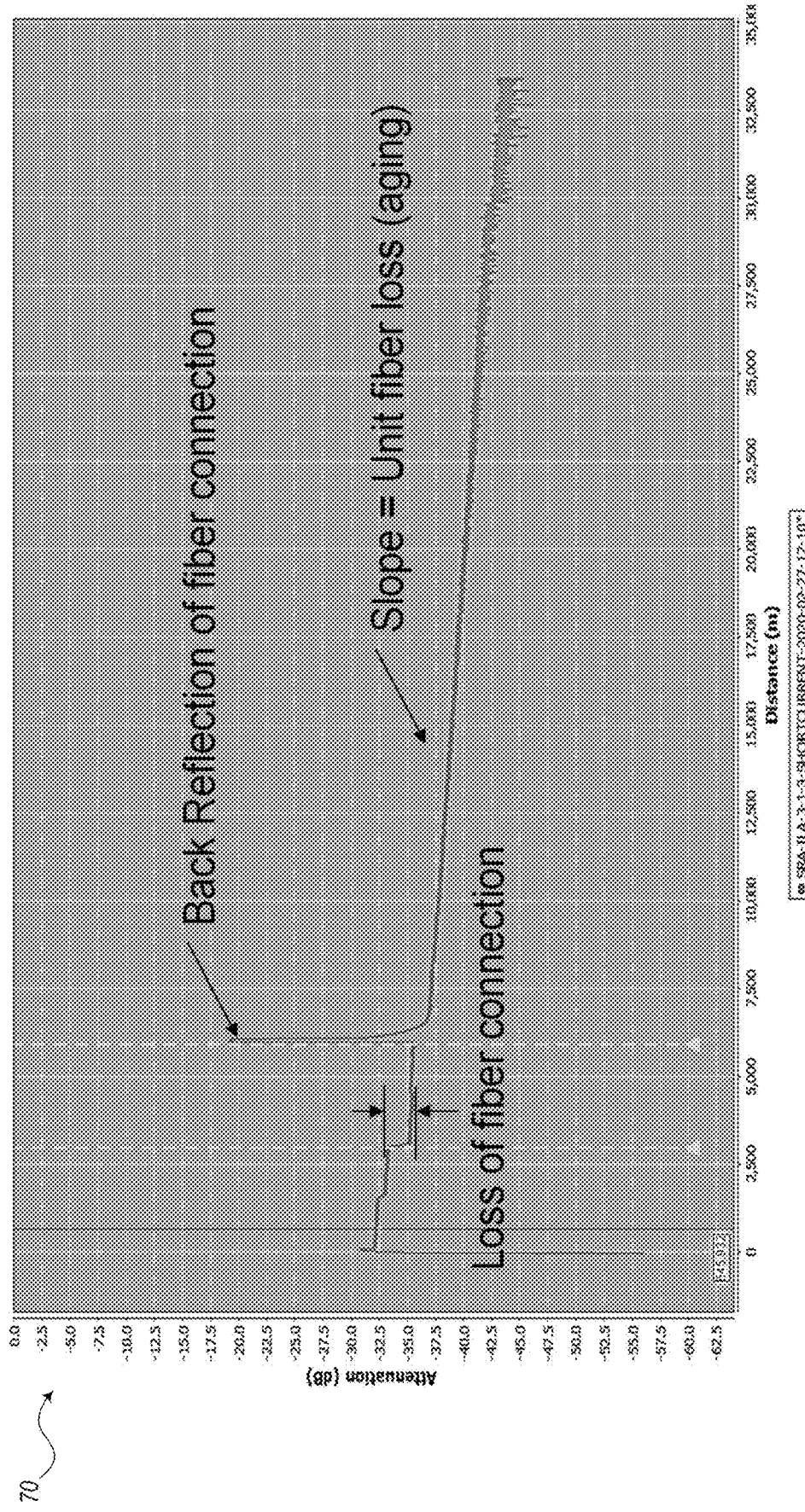
FIG. 9B is a graph 70 showing results of an OTDR scan, according to various embodiments.

FIG. 9B is a graph 70 showing results of an OTDR scan. The graph 70 shows attenuation (dB) versus distance along the optical fiber span. The OTDR scan can be displayed (e.g., on a UI of the I/O interfaces 16) for allowing the user to determine various events or characteristics of the network. For example, the graph 70 of the OTDR scan may expose a loss of fiber connection 72, a back-reflection of a fiber connection 74, a slope 76 for allowing a unit fiber loss (e.g., aging) to be detected, among other characteristics. The changes of the OTDR trace over time may indicate various events that may be happening to the inter-node fibers 40.

Figure 10:
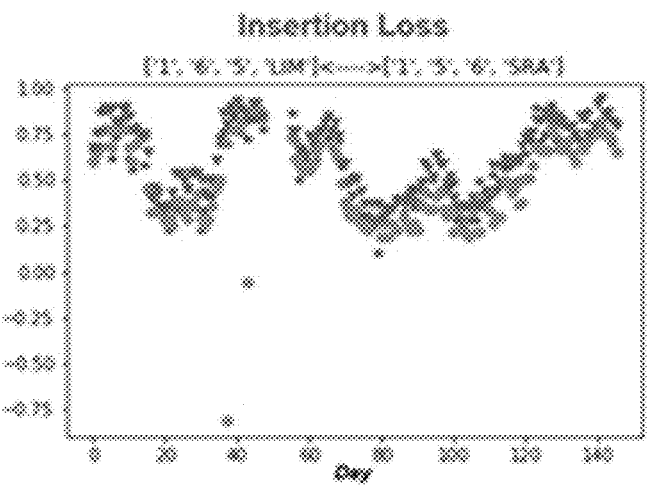
FIG. 10 is a graph showing an example of Insertion Loss (IL) performance of an intra-NE fiber connection between an EDFA card and a Raman amplifier card, according to various embodiments.

FIG. 10 is a graph showing an example of Insertion Loss (IL) performance of an intra-NE fiber connection over 147 days of connection between port 1-6-5 of an EDFA card and port 1-5-6 of a Raman amplifier card. In this case, the IL fluctuates significantly. Because the hard-coded threshold for high IL between intra-NE connection is 1.5 dB in the system, there is no alarm or warning for this connection. However, this IL fluctuation is enough for causing fluctuation of signal performance. This example demonstrates being able to proactively monitor the health of the intra-NE jump fibers and identify the vulnerable ones.

According to other embodiments, Polarization effects can be monitored to determine the health of fibers and fiber connections 30 of an optical network 32. For example, if State of Polarization (SOP) parameters are presented at every span, SOP transients can be detected.

Polarization Mode Dispersion (PMD) is another Polarization Effects parameter that can be detected from PM data at the Receiver of an optical signal. PMD occurs in single-mode fibers. It is the delay between two polarization modes, captured as Differential Group Delay (DGD). DGD and CD provides a good indication that something has changed. Certain factors may contribute to PMD, such as a) bit rate of the signal, b) fiber core symmetry, c) environmental factors, d) bends or stress in the fiber, and others. If high PMD is measured at the Receiver, compensation for PMD may be required when the bit rate is greater than 40 Gbps. If abnormal PMD change and trend is detected at the receiver of an optical channel, it indicates changes of one or more of the fibers that transmitting the optical channel.

The SOP and PMD parameters can be provided to the user (e.g., network operator) by displaying the results on a user interface (e.g., I/O interface 16). In response to analyzing these results, the operator may determine or recommend certain solutions for minimizing the SOP and PMD. For example, some solutions may include employing next generation optical transmitters and receivers, employing improved fibers, employing a manufacturer's recommended installation techniques for fibers, or other various actions.

Therefore, according to various embodiments, the computer system 10 of the NOC may not specifically monitor PMs but will be able to receive PMs via the network interface 18. For example, this may be accomplished using a telemetry process. The NOC can then react to alarms, as needed, to solve certain issues in the network. The user at the NOC can view the data, which may be presented in graphs, tables, etc., as described above. From the presented data, the user can analyze the trends and changes in PMs.

Multiple conditions may be observed based on the root-cause of fibers and/or connectors being dirty, bent, disconnected, pinched, etc. These conditions may reference various alarms, such as a) Automatic Power Reduction (APR) Active (e.g., regarding an amplifier (EDFA, Raman), Variable Optical Amplifier (VOA), amplifier monitor, etc.), b) Signal Degrade on ETH, ETH100G, ETH10G, WAN, etc., c) Signal Degrade on OC/STM, STTP, STS/HO VC, VT/LO VC, etc., d) Signal Failure on OC/STM, STTP, etc., e) Excessive Error Rate on STS/HO VC, VT/LO VC, etc., f) Gauge Threshold Crossing Alert Summary (e.g., related to AMP, VOA, RAMAN, OTDRCFG, OPTMON, etc.), g) Group Loss of Signal, h) High Fiber Loss, i) High Received Span Loss, j) Input Loss of Signal of amplifier, k) Loss of Frame and Multi-frame (OTUTTP, ETTP), l) Loss of Frame, m) Loss of Multi-frame, n) Output Loss of Signal, o) Raman Failed to Turn On, p) Shut-off Threshold Crossed, q) Input Loss of Signal, r) Loss of Signal, s) Loss of Synchronization Messaging Channel, t) Low Optical Return Loss at Input, u) Low Optical Return Loss at Output, v) ODU Signal Degrade, w) ODU Signal Fail, x) OSC Loss of Signal, y) OSC Signal Degrade, z) OTU Signal Degrade, aa) OTU Signal Fail, ab) Loss of Lock (e.g., bent, coiled, etc.), ac) Loss of OPU Multi-frame Identifier, and others.

According to the various embodiments of the present disclosure, the comprehensive fiber and fiber connection health analyzer 24 is configured to support a fiber health analyzing system to log PM data obtained over time regarding the optical network including both inter-node and intra-node fibers and fiber connections. Data is obtained not only from line fibers, but also from jump fiber connections within a shelf or node itself. Logging and displaying the short-term and long-term data of the photonic components can provide a valuable tool for network operators to see short-term events and long-term trends which may indicate that the fiber and fiber connections may be vulnerable to current or future issues or may be presently problematic. As a result of the computer system 10 providing this useful information in comprehensive displays, the network operator can response in any number of ways to remedy detectable current or future issues.

Data can be obtained from various monitoring sites throughout the network. For example, PM data may be obtained from input ports and output ports of the nodes 34, 36 and/or other ports associated with Intermediate Line Amplifiers (ILAs), intra-node components, etc. The monitoring devices may obtain Optical Power In, Optical Power Out, Optical Return Loss (ORL), OTDR trace information, OSC delay measurement, OSC span loss measurement, SOP measurements, etc. The comprehensive fiber and fiber connection health analyzer 24 may enable the processing device 12 to then use any suitable methods to construct additional information or metadata from the combination of multiple data sources.

Additionally, the monitoring device may be configured to obtain adjacency (or topology) information to determine how ports are connected in transmit-receive pairs. The procedures of the comprehensive fiber and fiber connection health analyzer 24 may be used for analyzing the comprehensive historical data of the quality of fibers, fiber connections, to thereby identify vulnerable fiber and fiber connections that may need attention (e.g., maintenance, replacement, etc.). The analysis includes not only the instant (or newly obtained) data, but also historical averages and/or trends. The analysis may also detect ORL, and/or OSC delay measurement, OSC span loss measurement, tide marking, alarm data, etc., along with derived metrics which may be used to help discover more fiber problems.

In addition to obtaining, logging, and presenting PM data, the comprehensive fiber and fiber connection health analyzer 24 may be configured to utilize Machine Learning (ML) techniques, algorithms, models, etc., which may be trained based on historical data. The training of ML models may involve a supervised training process of receiving expert rules, labels, tickets, etc. from one or more users. The ML techniques may include performing a classification process to accurately classify various vulnerabilities of fibers, connectors and other fiber connections, etc. The classification process can be based on expert rules, supervised ML trained with labels from operator feedback in one or more ticketing systems, etc.

The comprehensive fiber and fiber health analyzer 24 may provide additional features and results, as follows. Different visualization, sorting, and grouping flexibilities for displaying reports allows the user to view the data based on different priorities. Risk assessment of overlaid services, considering, for example, optical margins at receiver OCLD, type of fiber issue, importance and number of services potentially affected. Also, specific client-defined use-cases may be used to reveal a malicious addition of new fibers, detect that a fiber is being physically moved, etc.

Figure 11:
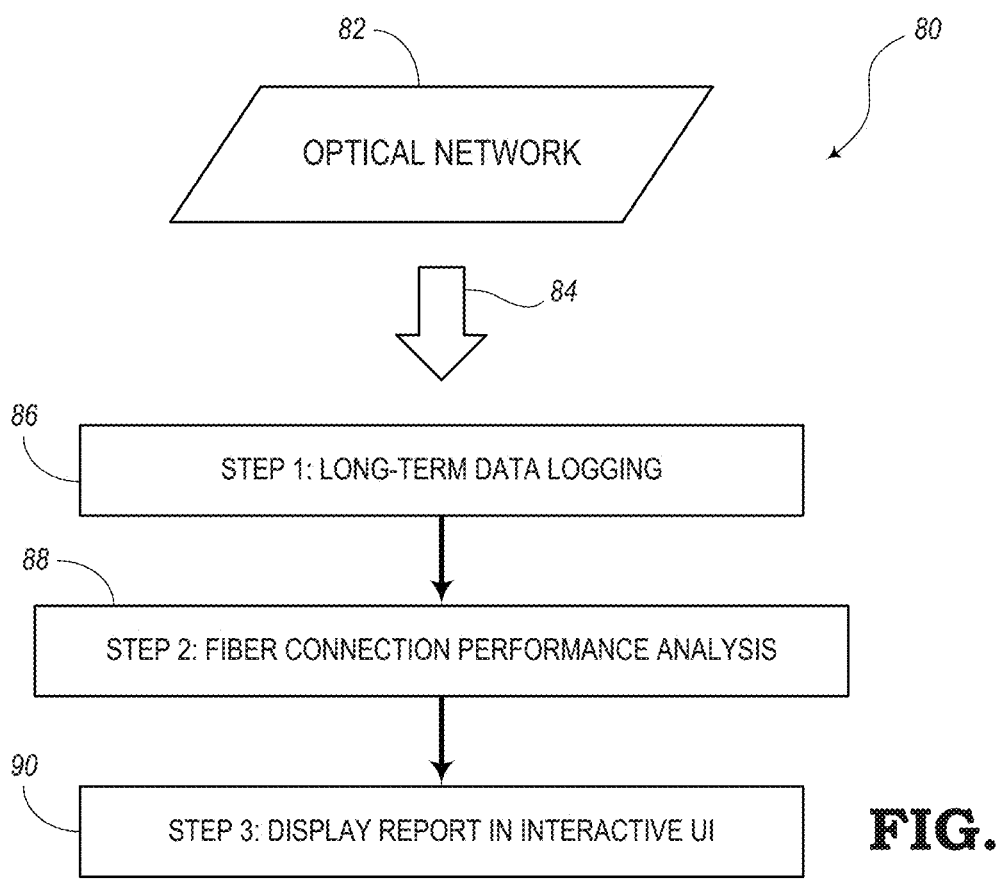
FIG. 11 is a diagram showing a system including steps for monitoring and analyzing the fiber and fiber connections of an optical network, according to various embodiments.

FIG. 11 is a diagram showing an embodiment of a system 80 (e.g., computer system 10) including steps for monitoring and analyzing the fiber connectivity of an optical network 82. More particularly, the system 80 is configured for analyzing a fiber connection, which may include a combination of optical fibers, connectors, etc. Monitoring devices (not shown) throughout the optical network 82 are used to obtain data 84 (e.g., PM data, alarms, etc.) continuously or periodically from the optical network 82 for processing. Block 86 includes a first step for "long-term data logging," which may include logging the data 84 in the memory device 14 and/or database 20 of the computer system 10.

Next, block 88 includes a second step for executing a "fiber connection performance analysis" or other analysis for determining the performance of fiber and fiber connections. The fiber connection in this embodiment may include fibers, fiber connectors, and/or other fiber connection components at a connection site or over the entire optical network including both inter-node fibers (e.g., fiber spans, fiber links, etc.) and intra-node fibers and fiber connection components (e.g., jump fiber, patch cord, ports, connectors, Fiber Interconnection Management device (FIM), etc.). The fiber connection performance analysis may include determining currently-detected threshold crossings, unfavorable long-term trends, or other features as described throughout the present disclosure.

The system 80 further includes block 90, which include a third step (i.e., "displaying report in interactive UI") for displaying a report of the performance analysis (block 88) in an interactive User Interface (UI), such as one of the I/O interfaces 16 of the computer system 10. The comprehensive fiber and fiber connection health analyzer 24 may be configured to control the UI to allow it to display the various graphs, tables, etc. in any suitable format and using any suitable variables for clearly demonstrating to the user the condition of the optical network 82. The UI may be interactive, allowing the user to switch between different graphs, tables, etc., zoom in, zoom out, highlight certain portions of the display, show certain characteristics, parameters, values of certain points within the display, and other suitable UI functions.

Thus, FIG. 11 shows the steps of fiber connection monitoring and analysis systems. The optical network 82 reports PMs, alarms of all ports and topology information. A data storage server (e.g., associated with the computer system 10) may be used to receive and store the data for as long as needed. The historical data may then be pulled for performance analysis of the fibers, fiber connectors, and other photonic components along an optical path. The results may be displayed in an interactive UI, which allows users to view the analysis results of different connections with different sorting and grouping criteria.

Long-Term Data Logging

Long-term data logging may include storing PMs, alarms, and metadata for fiber connection performance analysis in a suitable storage device (e.g., memory device 14, database 20, data storage server, etc.). The following are various types of information that may be stored on a long-term basis: a) instant/average/min/max power of transmit ports (e.g., PTx, PTx_avg, PTx_min, PTx_max, etc.) at one end of the path, b) instant/average/min/max power of receive ports (e.g., PRx, PRx_avg, PRx_min, PRx_max, etc.) at the other end of the path, c) instant/average/min/max Optical Return Loss (ORL) of transmit ports (e.g., ORLTx, ORLTx_avg, ORLTx_min, ORLTx_max, etc.) at one end of the path, d) instant/average/min/max ORL of receive ports (e.g., ORLRx, ORLRx_avg, ORLRx_min, ORLRx_max, etc.) at the other end of the path, e) alarms of faulty connections (e.g., Loss of Signal (LOS), high Insertion Loss (IL), low ORL, etc.), f) adjacency/topology information relating two endpoints for each fiber or path, and other types of long-term information.

Analysis of the fibers and fiber connections (e.g., fiber connection analysis) may be performed for each individual path. The analysis may include the steps of classifying and quantifying fiber issues. An initial classification may be based on PM behavior and may be configured to highlight various issues (e.g., problematic fiber connections). The initial classification can also provide a summarization of symptoms to help network operators identify root-causes of the issues. This initial classification can be tuned for accuracy over time, such that, with enough operator feedback collected through ticketing systems, supervised ML approaches can be utilized to eventually provide a more accurate classification to define the different classes of photonic path problematic, which may be based on various root causes. In addition to these generic classes, customized classes may be available for different network operators based on their own experiences with photonic path issues.

Data processing methods may be performed (e.g., by the comprehensive fiber and fiber connection health analyzer 24) based on behavior, trends, thresholds, etc. associated with the PM data. The following includes examples of generic classes of fiber issues that may be detected: a) a currently-obtained parameter of a fiber connection crosses a threshold, b) a slow trend over time, c) recent sudden changes with respect historical data, etc. The data processing methods may provide a record of historical incidents in the photonic path, such as: a) events recorded by alarms and/or averaged PMs (e.g., PTx_avg, PRx_avg, ORLTx_avg, ORLRx_avg, etc.), b) fast events recorded by tide marking PMs (e.g., PTx_min, PTx_max, PRx_min, PRx_max, ORLRx_min, ORLRx_max, ORLTx_min, ORLTx_max, etc.), and/or others.

In addition, the comprehensive fiber and fiber connection health analyzer 24 may be configured to calculate a "severity" score which may be used for defining the urgency of any photonic path issues. The severity score may be computed based on the fiber issues detected and the importance of the services that pass through the fibers, connectors, ports, or other components of a path. Weights may be applied to different classes of fiber issues and different services for calculating the severity score. These weights may be hyper-parameters of an ML process and can be fine-tuned, as needed, based on customer priorities, Service Level Agreements (SLAs), previous results, and/or other types of supervised or unsupervised feedback. A report of the photonic path condition may be generated at the end of each analysis which includes all the above analysis results.

Fiber Connection Performance Analysis

Figure 12:
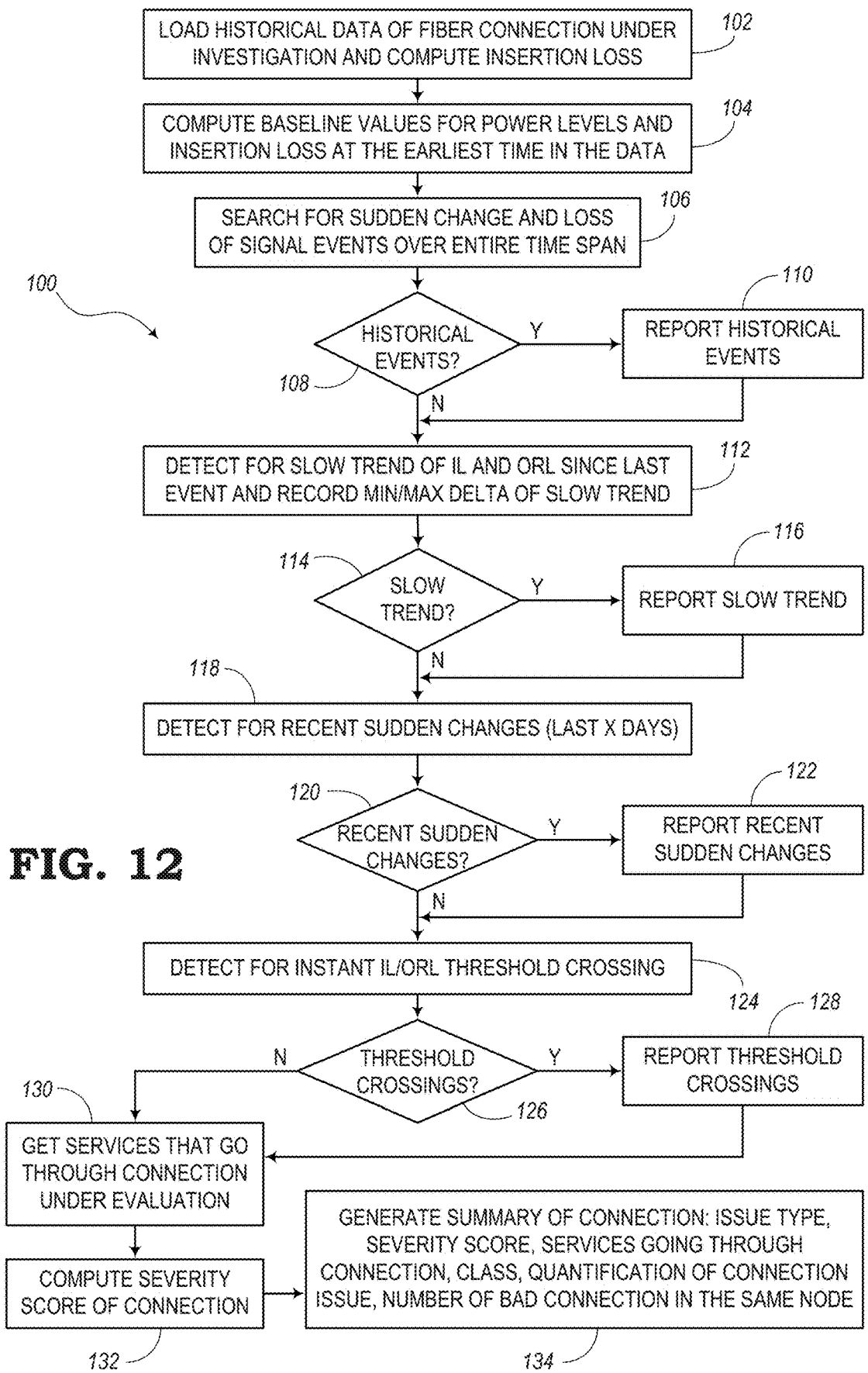
FIG. 12 is a flow diagram showing a process for performing an analysis of fibers and fiber connections (e.g., including both inter-node and intra-node fibers and fiber connections) for each individual fiber path, according to various embodiments.

FIG. 12 is a flow diagram showing an embodiment of a process 100 for performing an analysis of fiber and fiber connection performance (e.g., including both inter-node and intra-node fibers and fiber connections) for each individual fiber path. More particularly, the process 100 is related to analyzing a "fiber connection," which may include fibers, connectors, ports, and other fiber connection components. The process 100 includes loading historical data of all network fibers (block 102) and computing instantaneous/average/tide-marking Insertion Loss (IL) parameters. IL parameters may be computed, for example, using the following equations:

$$IL_{inst} = P_{Tx} - P_{Rx} \quad \text{(Eq. 1)}$$

$$IL_{avg} = P_{Tx\_avg} - P_{Rx\_avg} \quad \text{(Eq. 2)}$$

$$IL_{Tx\_min-Rx\_min} = P_{Tx\_min} - P_{Rx\_min} \quad \text{(Eq. 3)}$$

$$IL_{Tx\_max-Rx\_max} = P_{Tx\_max} - P_{Rx\_max} \quad \text{(Eq. 4)}$$

Figure 13:
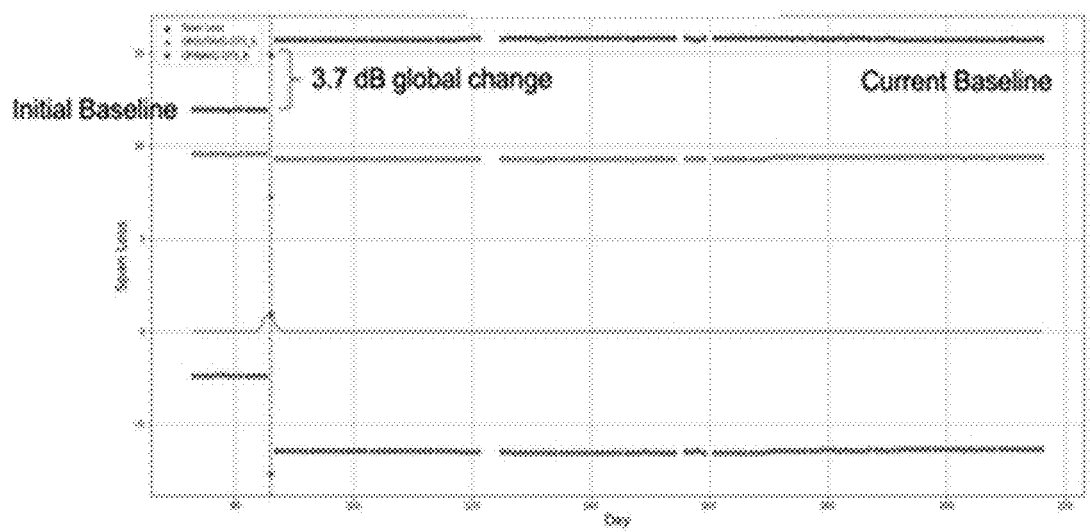
FIG. 13 is a graph showing the change in loss with respect to an initial baseline value, according to various embodiments.

The process 100 also include calculating baseline values for IL (block 104). In order to track the absolute change in loss, the analysis first calculates the IL/ORL at the beginning of history (ideally when the fiber path was first provisioned). This data can be used to calculate absolute changes relative to present time as shown in FIG. 13, which is a graph showing the change in loss with respect to an initial baseline value.

Also, the process 100 includes block 106, which indicates a step to search and count for historical events. The analysis procedure, according to some embodiments, may be configured to search for the historical fault events, operation events, and sudden changes of the fiber and fiber connection under investigation. The criteria of the above events, in some embodiments, may include:

A. Fiber disconnected events due to faults or operations such as:
1. If alarm of faulty connections (e.g., LOS, high IL, low ORL, etc.) was raised on the ports.
2. If Rx port of the fiber reports null or very low power while PMs of Tx port are within normal operation range.

B. Sudden change events of $IL_{avg}$ and $ORL_{avg}$, such as checking for sudden $IL_{avg}/ORL_{avg}$ change over time. In the example of FIG. 13, the step of block 106 may include looking for a sudden jump instead of a slow trend. The sudden jumps can be detected via the inflection points of the 2nd derivative of $IL_{avg}/ORL_{avg}$ time series.

C. Search and count for tide-marking events. For example, tide-marking events can capture fast performance (e.g., IL/ORL) fluctuation while averaged performance can still be stable. Tide-marking events may be counted separately not only since they may be related to a fast connection performance change within a data sample, but also because they may be related to a fast signal fluctuation. However, in this situation, it still may be worth notifying the user of such fluctuations in the system, which may be helpful information for debugging. Tide-marking events may be counted, for example, under the following conditions:

1. Large delta of ORL tide-marking within a data sample, such as:

$$Delta_{RxORL\_tidemarking} = ORL_{Rx\_Max} - ORL_{Rx\_Min} > Threshold_{ORL\_tidemarking} \quad (Eq. 5)$$

or $$Delta_{TxORL\_tidemarking} = ORL_{Tx\_Max} - ORL_{Tx\_Min} > Threshold_{ORL\_tidemarking} \quad (Eq. 6)$$

where $ORL_{Rx\_Max}$, $ORL_{Rx\_Min}$, $ORL_{Tx\_Max}$, and $ORL_{Tx\_Min}$ are reported within the same time period.

Figure 14A:
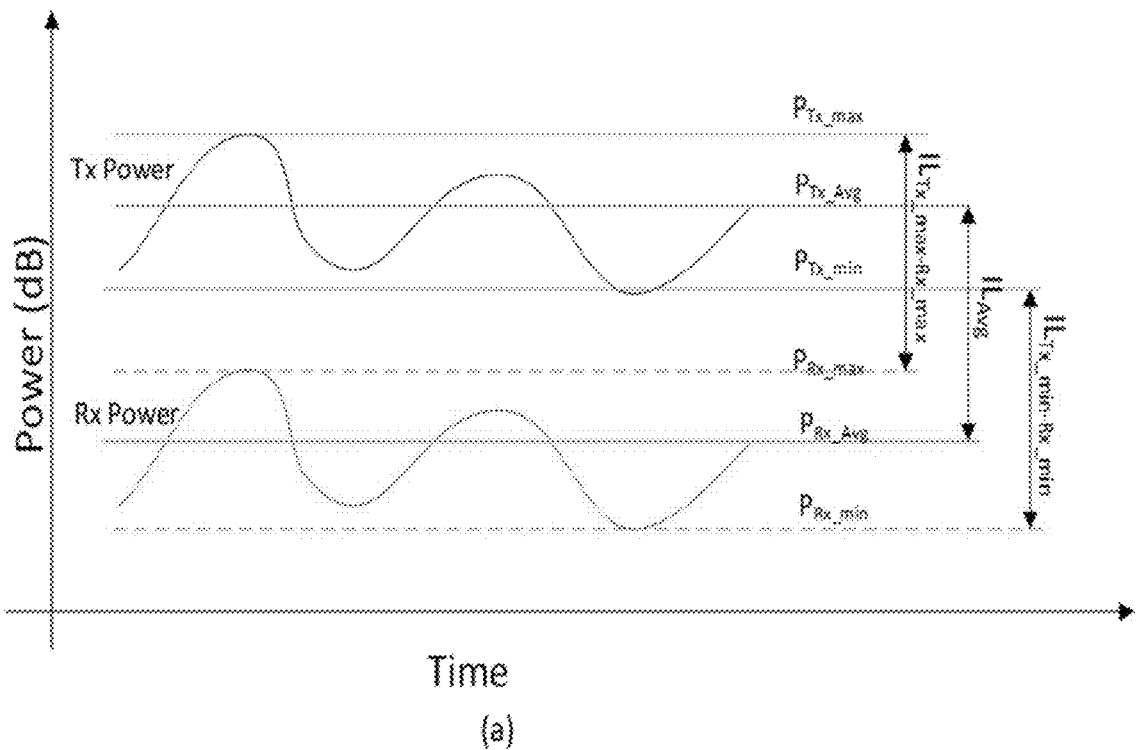
FIGS. 14A and 14B are graphs showing fluctuating signal power transmitted over the fiber, according to various embodiments.
Figure 14B:
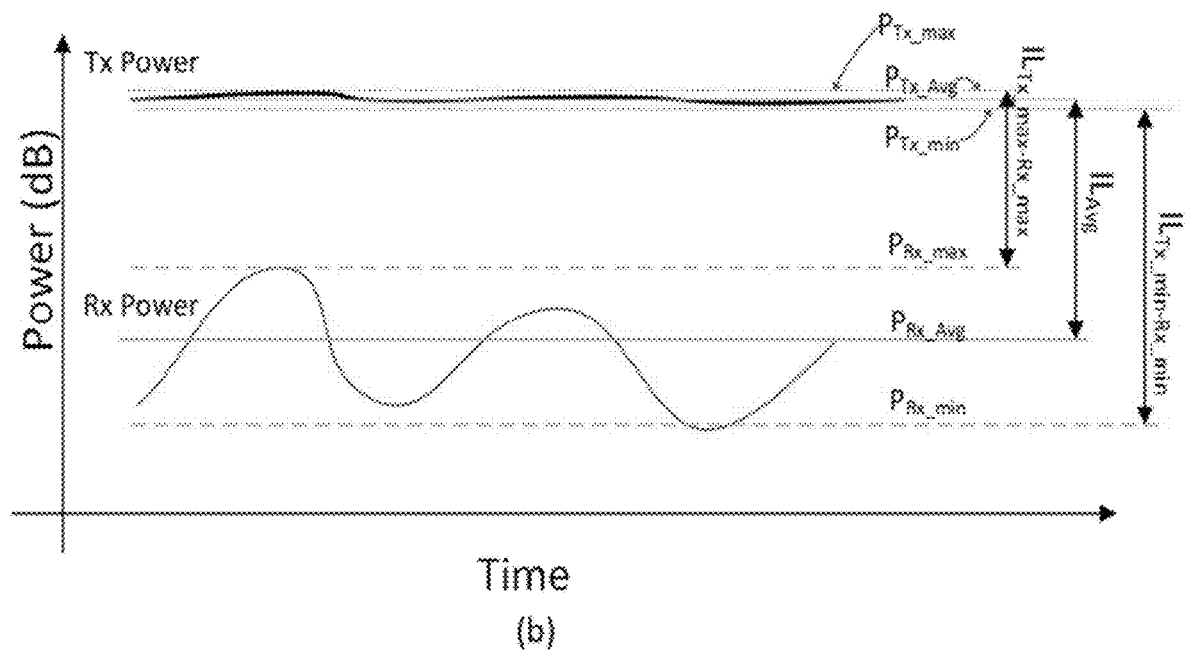

2. IL tide-marking events detected. For example, if the fiber connection is stable, even though the signal power transmitted over the fiber is fluctuating, $IL_{avg}$, $IL_{Tx\_min-Rx\_min}$, and $IL_{Tx\_max-Rx\_max}$ shall be the same, as shown in FIG. 14A. However, if a vulnerable connection causes quick fluctuation of IL, tide-marking of IL will be able to capture the fluctuation while $IL_{avg}$, may not see the fluctuation, as shown in FIG. 14B. The IL tide-marking will most likely be indicating a connection issue if:

$$IL_{Tx\_min-Rx\_min} > IL_{avg} > IL_{Tx\_max-Rx\_max} \quad (Eq. 7)$$

and $$Delta_{IL\_tidemarking} = IL_{Tx\_min-Rx\_min} - IL_{Tx\_max-Rx\_max} > Threshold_{IL\_tidemarking} \quad (Eq. 8)$$

If historical events are detected (block 108), the process 100 include reporting historical event issues (block 110). Otherwise, the process 100 skips block 110.

D. The process 100 includes searching for slow trends (block 112) of IL and ORL since a last event and recording min/max deltas of slow trends. If a slow trend is detected (block 114), the process 100 includes reporting a slow trend issue (block 116). Otherwise, the process 100 skips block 116.

Figure 15:
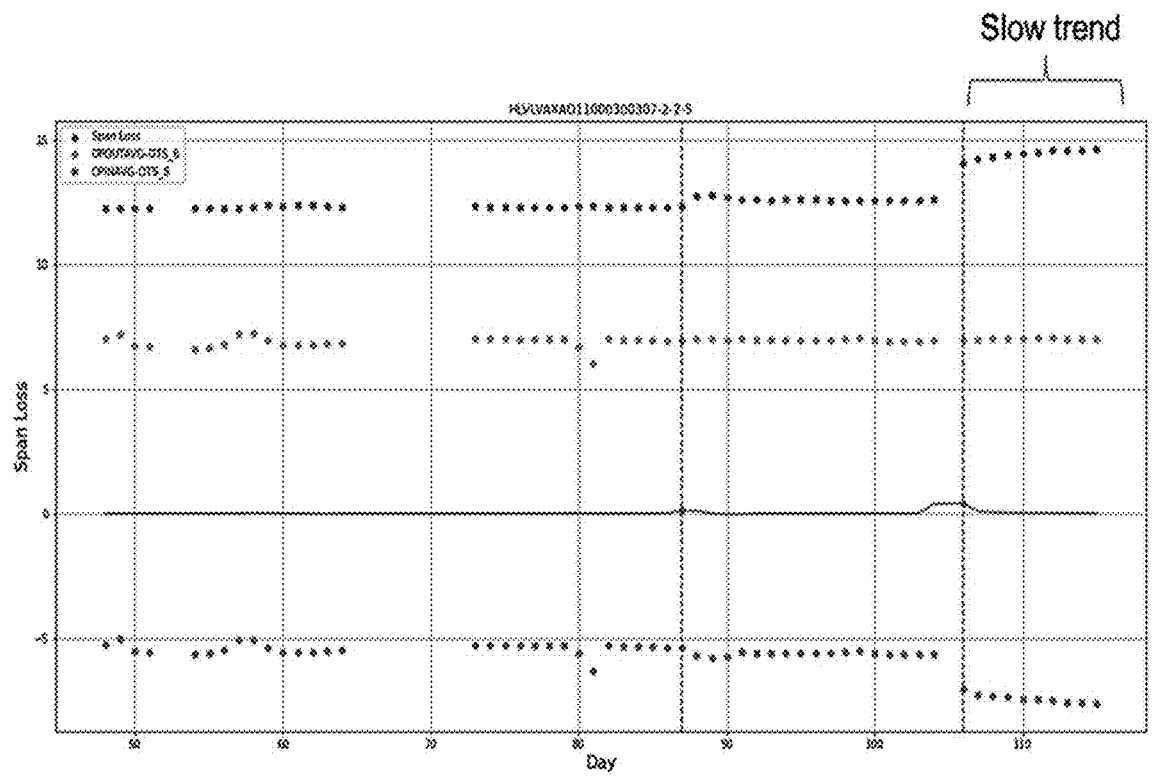
FIG. 15 is a graph showing an example of an IL slow trend, according to various embodiments.

Slow trends may be detected since the last photonic path issue (e.g., fiber connection incident) which may be obtained by the previous step. Fiber connections with IL and ORL slowly changing may be a sign of bad fiber connections or the fibers may be under varying mechanical or environmental impacts. An example of IL slow trend is shown in FIG. 15 after a last incident. According to some embodiments, a slow trend may be detected as follows:

$$Delta_{IL\_slowtrend} = Max_{IL\_avg(t)} - Min_{IL\_avg(t)} > Threshold_{IL\_slowtrend}, t \in [t_{last\_incident}, now] \quad (Eq. 9)$$

$$Delta_{ORL\_Tx\_slowtrend} = MaxORL_{Tx\_avg(t)} - MinORL_{Tx\_avg(t)} > Threshold_{ORL\_slowtrend}, t \in [t_{last\_incident}, now] \quad (Eq. 10)$$

$$Delta_{ORL\_Rx\_slowtrend} = Max_{ORL\_Rx\_avg(t)} - Min_{ORL\_Rx\_avg(t)} > Threshold_{ORL\_slowtrend}, t \in [t_{last\_incident}, now] \quad (Eq. 11)$$

Note, because slow trend is detected since the last incident, the Max/Min delta computed by Equations 9-11 are due to slow trend.

E. The process 100 includes detecting recent sudden changes (block 118), such as recent connection performance fluctuations in last X days, where X, in some embodiments, may be defined by a user. If recent sudden changes are detected (block 120), the process 100 reports the recent change issues (block 122). Otherwise, the process 100 skips block 122.

Figure 16:
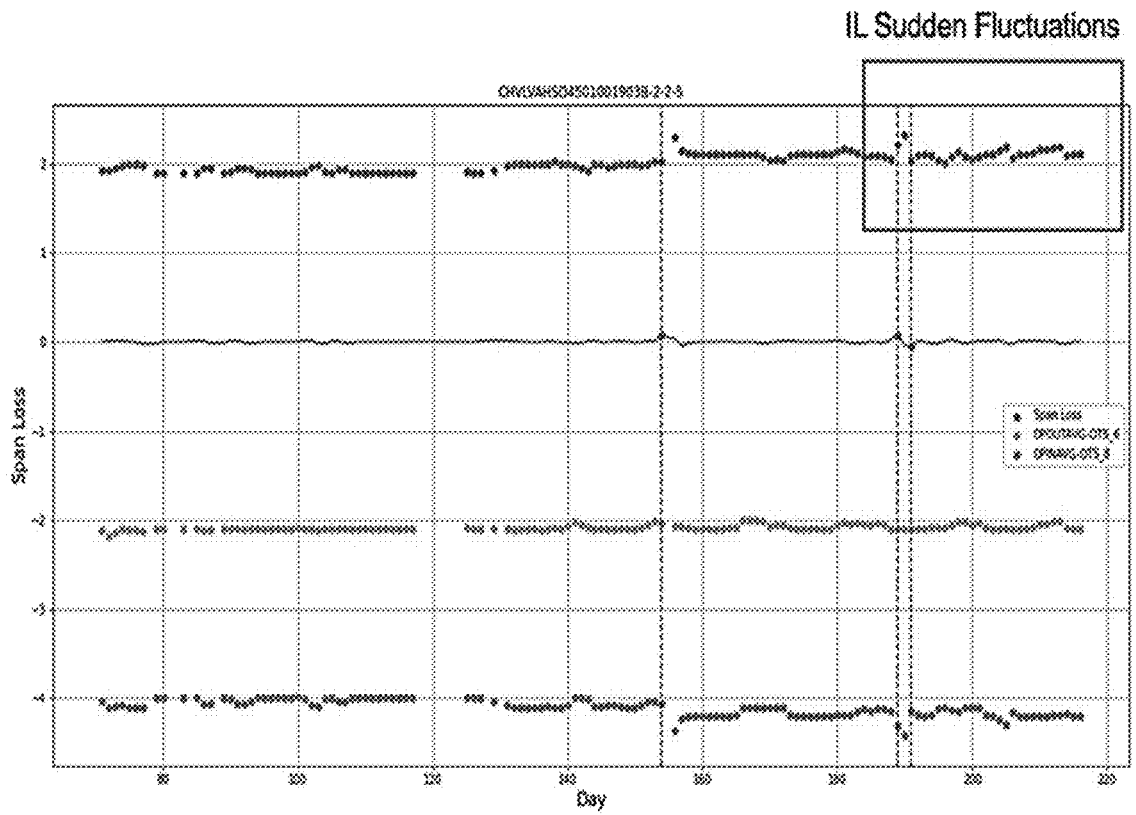
FIG. 16 is a graph showing an example of sudden fluctuations in the IL parameter, according to various embodiments.

Sudden changes may be detected by comparing recent data with historical connection incidents. FIG. 16 is a graph showing an example of sudden fluctuations in the Insertion Loss (IL) parameter. In this case, it may be worthwhile to give the recent fluctuations more attention. Therefore, the process 100 may detect sudden changes in the last X days separately. The recent connection fluctuations may be detected if:

$$Delta_{IL\_sudden\_fluctuation} = Max_{IL\_avg(t)} - Min_{IL\_avg(t)} > Threshold_{IL\_recent\_fluctuation} \text{ (where } t \text{ is within the last } X \text{ days)} \quad (Eq. 12)$$

$$Delta_{ORL\_Tx\_fluctuation} = Max_{ORL\_Tx\_avg(t)} - Min_{ORL\_Tx\_avg(t)} > Threshold_{ORL\_fluctuation} \text{ (where } t \text{ is within the last } X \text{ days)} \quad (Eq. 13)$$

$$Delta_{ORL\_Rx\_fluctuation} = Max_{ORL\_Rx\_avg(t)} - Min_{ORL\_Rx\_avg(t)} > Threshold_{ORL\_fluctuation} \text{ (where } t \text{ is within the last } X \text{ days)} \quad (Eq. 14)$$

F. The process 100 further includes detect if an absolute value of an instant IL/ORL parameter crosses a threshold (block 124). If it is determined in block 126 that the threshold is crossed, the process 100 reports an issue of the current parameters crossing the threshold (block 128). Otherwise, the process 100 skips block 128.

The absolute value of the instant IL/ORL parameter may be detected as crossing the threshold if one of the following occurs:

$$IL_{inst} > Threshold_{abs\_IL} \quad (Eq. 15)$$

or $$ORL_{inst} > Threshold_{abs\_ORL} \quad (Eq. 16)$$

G. The process 100 also includes retrieving services that go through the connection under evaluation, as indicated in block 130. Knowing the services that go through the connection under evaluation may help a customer evaluate the risk of the connection issues and prioritize maintenance and/or service routing. This information may be used for calculating a severity score (block 132) and may be included in the report.

H. The process 100 includes compute the severity score of connection, which may be configured to consider all categories of connection issues and statistics of historical events with weights that can be defined by network operators. A general expression of the severity score, according to one embodiment, includes:

$$\text{Severity Score} = \Sigma w_{connection\_issue\_i} S_{connection\_issue\_i} \Sigma w_{service\_j} \quad (Eq. 17)$$

where $S_{connection\_issue\_i}$ is the severity score of each class of connection issues based on the results of steps C-F and user-defined hyper-parameters. The term $w_{connection\_issue\_i}$ is the weight applied on each class of connection issues. The term $w_{service\_j}$ is the weight of each service of all services j=1~N that goes through the connection. Note, if no end-to-end topology is available, term $\Sigma w_{service\_j}$ can be removed from Eq.17. All weights are configurable while having a default value, such that the severity score can be calculated based on users' priorities. Eqs. 18-24 below show an example of how severity score of individual connection issues may be calculated.

A first connection issue (i.e., connection_issue_1) may be defined as an issue when a current connection parameter crosses a threshold:

$$S_{connection_{issue_1}} = \max\left(\left[a1\frac{\min([ILins, h_{IL_{abs}}])}{Threshold_{Abs_{IL}}},\right.\right.$$
$$\left.\left.a2\frac{Threshold_{Abs_{ORL}}}{\max[ORL_{Tx_{inst}}, h_{ORL_{abs}}]}, a2\frac{Threshold_{Abs_{ORL}}}{\max[ORL_{Rx_{inst}}, h_{ORL_{abs}}]}\right]\right)$$ (Eq. 18)

where $h_{IL_{abs}}$ and $h_{ORL_{abs}}$ are hyper-parameters that may be chosen to indicate very bad connection performance (e.g., 99% of connections in the network having better performance than the hyper-parameter chosen). The variables a1 and a2 are weights to balance the contribution from the three terms, such that the three terms will have the same maximum value, where:

$$a1\frac{h_{IL_{abs}}}{Threshold_{Abs_{IL}}} = a2\frac{Threshold_{Abs_{ORL}}}{h_{ORL_{abs}}}$$ (Eq. 19)

A second connection issue (i.e., connection_issue_2) may be defined as an issue of a slow trend over time:

$$S_{connection_{issue_2}} =$$ (Eq. 20)
$$\max\left(\left[\begin{array}{l}b1*\min([Delta_{IL_{slowtrend}}, h_{IL_{slowtrend}}]),\\ b2*\min([Delta_{ORL_{tx_{slowtrend}}}, h_{ORL_{slowtrend}}]),\\ b2*\min([Delta_{ORL_{Rx_{slowtrend}}}, h_{ORL_{slowtrend}}])\end{array}\right]\right)$$

Where $h_{IL_{slowtrend}}$ and $h_{ORL_{slowtrend}}$ are hyper-parameters that may be chosen to indicate very bad connection performance (e.g., 99% of connections in the network having better performance than the hyper-parameter chosen). The variables b1 and b2 are weights to balance the contribution from the three terms, such that the three terms will have the same maximum value, where:

$$b1*h_{IL_{slowtrend}} = b2*h_{ORL_{slowtrend}}$$ (Eq. 21)

A third connection issue (i.e., connection_issue_3) may be defined as a sudden change in the most recent X days:

$$S_{connection_{issue_3}} =$$ (Eq. 22)
$$\max\left(\left[\begin{array}{l}c1*\min([Delta_{IL_{sudden\_fluctuation}}, h_{IL_{sudden\_fluctuation}}]),\\ c2*\min([Delta_{ORL_{tx_{sudden\_fluctuation}}}, h_{ORL_{sudden\_fluctuation}}]),\\ c2*\min([Delta_{ORL_{Rx_{sudden\_fluctuation}}}, h_{ORL_{sudden\_fluctuation}}])\end{array}\right]\right)$$

Where $h_{IL_{sudden\_fluctuation}}$ and $h_{ORL_{sudden\_fluctuation}}$ are hyper-parameters which can be chosen to indicate very bad connection performance (e.g., 99% of connections in the network having better performance than the hyper-parameter chosen). The variables c1 and c2 are weights to balance the contribution from the three terms, such that the three terms will have the same maximum value, where:

$$c1*h_{IL_{sudden\_fluctuation}} = c2*h_{ORL_{sudden\_fluctuation}}$$ (Eq. 23)

A fourth connection issue (i.e., connection_issue_4) may be defined as having a record of historical connection incidents:

$$S_{connection_{issue_4}} = \min([\# \text{ of historical events}, h_{\# of\ historical\ events}])$$ (Eq. 24)

Finally, the process 100 may include generating a report as indicated in block 134 for the connection under evaluation. In addition to certain criteria (e.g., Connection Issue type, Severity Score, number of historical events and services that go through the connection, etc.) the number of bad connections in the same NEs may be counted, which may be associated with the environmental impact of the NE, poor workmanship, etc. This information may help the operator to prioritize maintenance of the NE.

Displaying Report in Interactive UI

After the analysis of each individual connection is done, the results will be consolidated into an interactive UI, such as one of the I/O interfaces 16, a GUI, etc. The UI could be configured to display a table view, which can be sorted based on any of the connection analysis outputs (e.g., Severity Score, number of historical events, severity of connection issue types, services that go through the connection, number of bad connections in the same NEs, etc.). The UI could also be configured to display a map view, which can show the network topology with color-coded fiber connections. For example, the color-coding can be based on any of the connection analysis outputs (e.g., Severity Score, number of historical events, severity of connection issue types, services that go through the connection, number of bad connections in the same NEs, etc.). A time series of connection performance (e.g., IL, ORL, or other parameters, over time) may be available for display upon the user's request. The UI may also be configured to display a statistical view of IL, ORL, etc. of all connections in the network.

Figure 17:
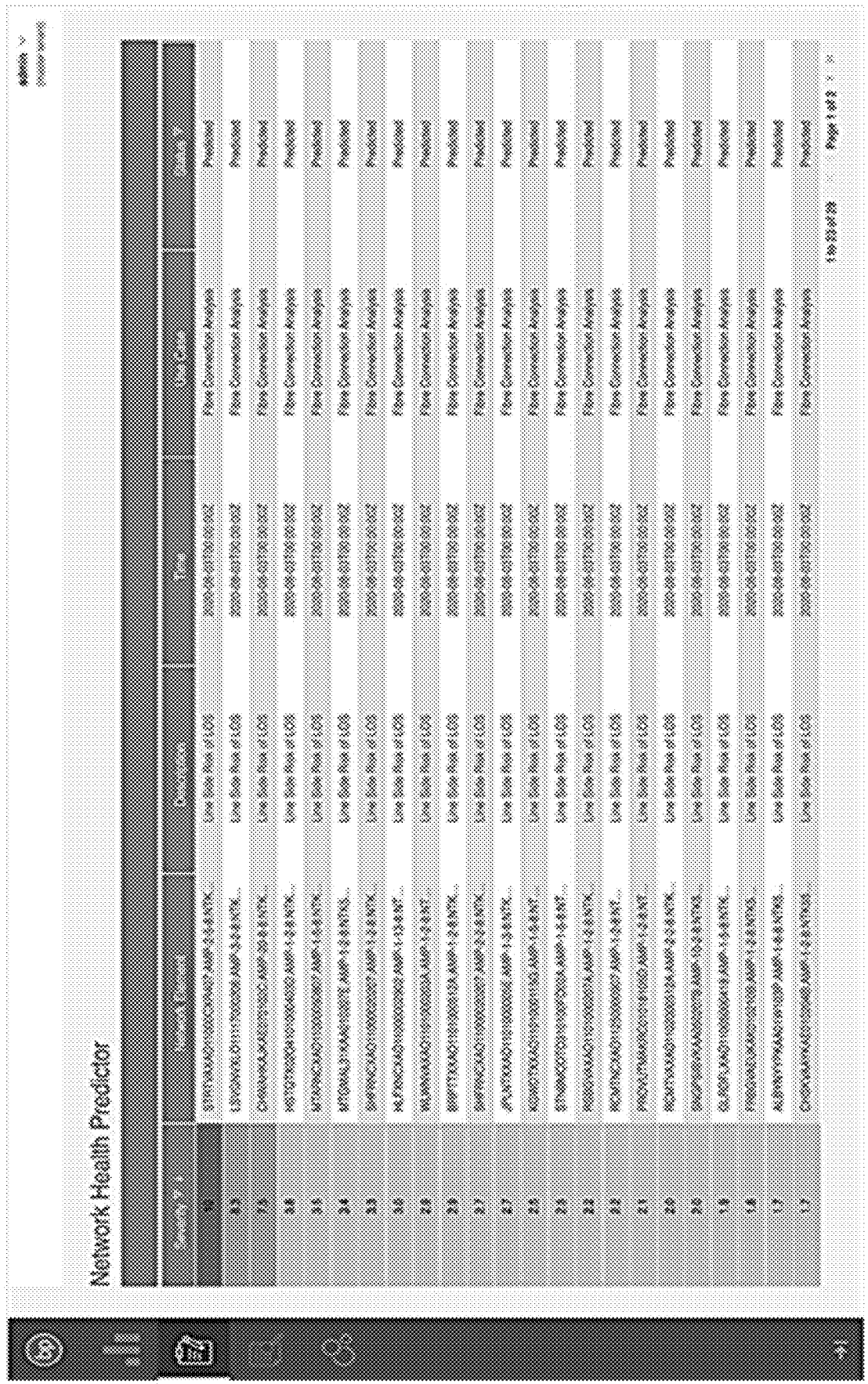
FIG. 17 is a diagram illustrating a screenshot of a User Interface (UI), according to various embodiments.

FIG. 17 is a diagram illustrating a screenshot of a UI 140. In this example, the UI 140 shows results of predicting the health of a network and may include a sorting of the risky fiber connections, where the fiber connections with the highest severity are displayed at the top of the UI 140.

Figure 18:
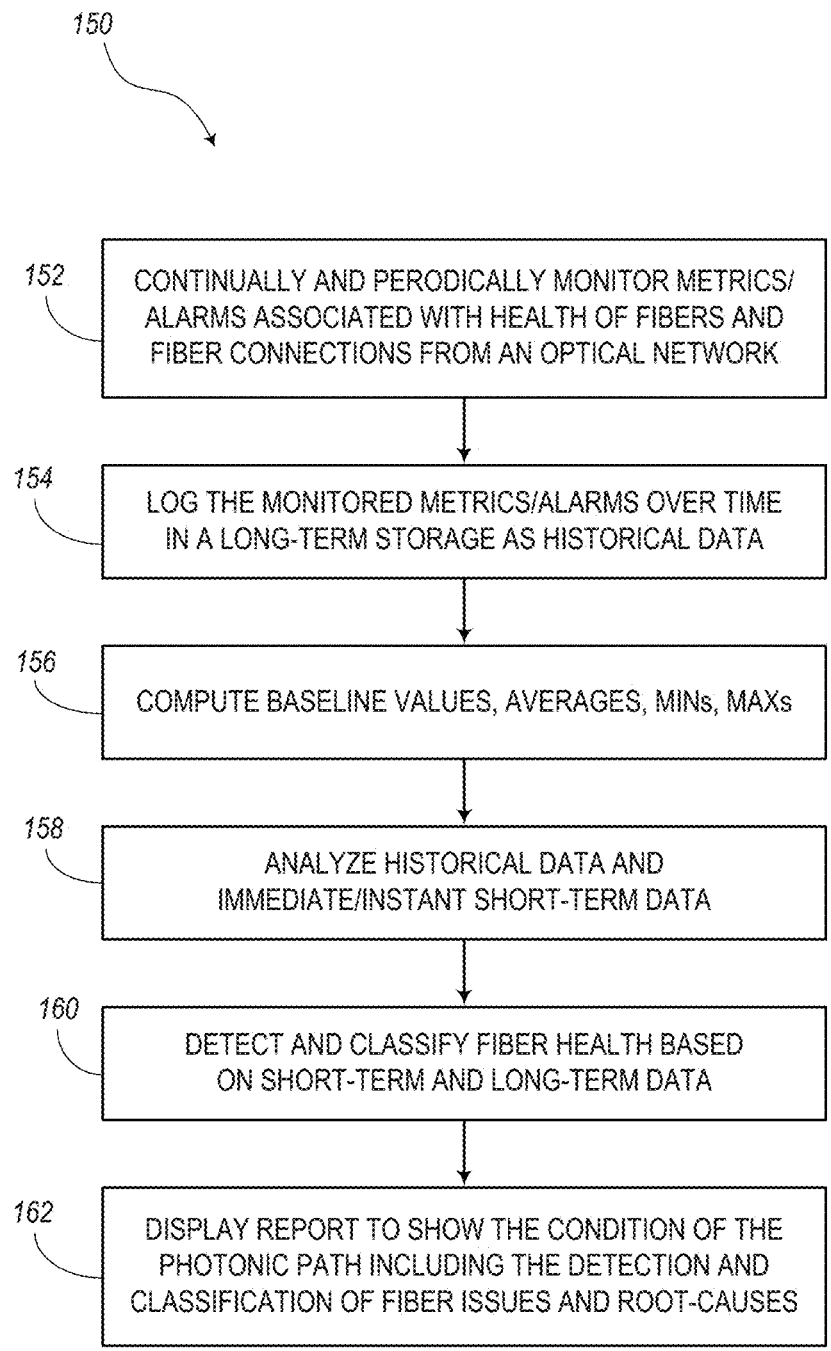
FIG. 18 is a flow diagram showing a process for handling short-term and long-term data associated with an optical system having a number of optical fibers and components and displaying results of fiber connection analysis procedures on a UI, according to various embodiments.

FIG. 18 is a flow diagram showing another embodiment of a process 150 for handling short-term and long-term data associated with a photonic path having a number of optical components and displaying results of fiber connection analysis procedures on a UI. In this embodiment, the process 150 includes continually and/or periodically monitoring parameters, metrics, PM data, alarms, etc. of an optical network including a fiber span and one or more fiber connections, as indicated in block 152. The process 150 may be executed for each individual fiber, between two adjacent nodes or two photonic devices within node in an optical system.

While monitoring these parameters, the process 150 further includes the step (block 154) of logging the monitored parameters, metrics, PM data, alarms, etc. obtained over time in long-term storage, whereby the obtained data is stored as historical data. The long-term data be PM parameters, alarms, metadata, etc., and may include ORL of transmit and receive ports, alarms of faulty connections, identification of LOS events, events of high IL, events of low ORL, adjacency/topology information, among other data. The process 150 also includes computing baseline values, averages, minimums, maximums, etc. from the logged data, as indicated in block 156. Next, the process 150 includes analyzing the historical long-term data along with immediate (or instant) short-term data, as indicated in block 158.

Based on the analysis of the short-term and long-term data, the process 150 is able to detect and classify fiber health issues, as indicated in block 160. Classifications of issues may include threshold-crossing events, identified slow trends, recent sudden changes, events recorded by alarms and/or averaged PMs, fast events recorded by tidemarking PMs, etc. In some embodiments, classification may include the use of ML models and may further include the use of supervised data from experts, operators, managers, or others who can provide useful rules, labels, hyper-parameters, etc. In some embodiments, ML models may be used for performing a risk assessment based on combinations of short-term data, long-term data, identified events, potential issues, trends, etc. Also, the ML models may detect severity, importance, or other factors for rating the fiber issues based on customer priorities, SLAs, feedback from previous results, etc.

At this point, the process 150 is configured to display a report to show the condition of the fiber connections including the detection and classification of the fiber issues, as indicated in block 162. The report may be displayed on a suitable display screen (e.g., UI) for a user (e.g., network operator) to allow analysis by the user and/or to identify or highlight certain conditions that may be observed as root causes of present or potential fiber issues.

Figure 19:
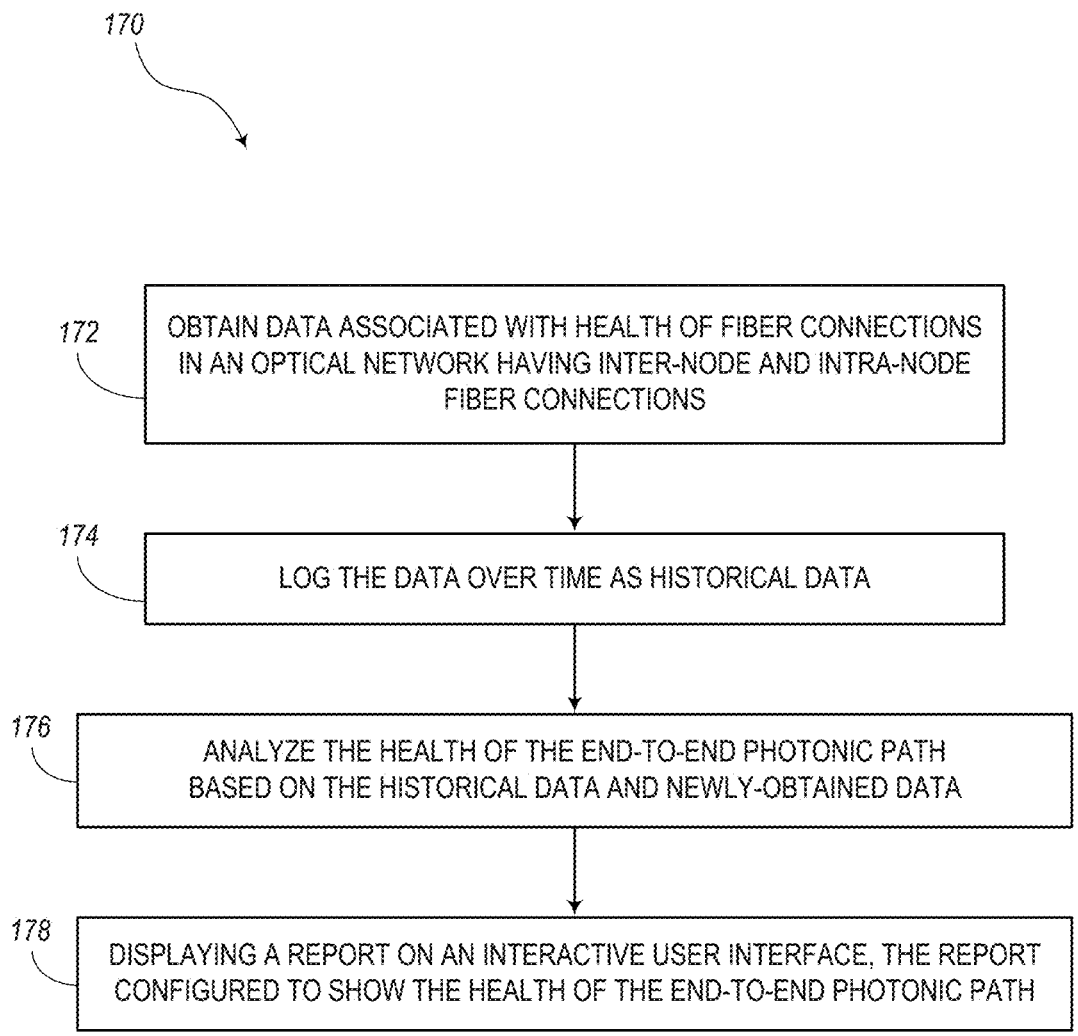
FIG. 19 is a flow diagram showing a generalized process, according to various embodiments.

FIG. 19 is a flow diagram showing another embodiment of a process 170. In this embodiment, the process 170 includes obtaining data associated with fiber connections in an optical network, as indicated in block 172. The fibers and fiber components, for example, may include at least an inter-node fiber connecting two adjacent network nodes and intra-node fiber connection associated with one or more photonic devices of each of the two adjacent network nodes. The process 170 further includes logging the data over time as historical data, as indicated in block 174. The process 170 also includes analyzing the health of the fiber and fiber connections based on the historical data and newly-obtained data, as indicated in block 176. Finally, the process 170 includes displaying a report on an interactive user interface, whereby the report is configured to show the overview of health of all fiber and fiber connections in the optical network.

According to some embodiments of the process 170, the process may include one or more fiber connections to be evaluated. A network interface may be configured to obtain the data on a periodic basis. The data may include Performance Metric (PM) data, parameters, alarms, and metadata associated with the performance of all fibers and fiber connections in the network. In some embodiments, the process 170 may further include the step of determining baseline values, averages, minimums, maximums, and trends from the historical data. The process 170 may also include the step of performing a risk assessment based on the health of fibers and fiber connections.

Furthermore, the process 170 may be configured such that the step of analyzing the health of the fibers and fiber connections may include steps of detecting one or more issues of the fibers and fiber connections and classifying the one or more issues. With the issues detected and classified, the process 170 may further be defined whereby the step of displaying the report on the interactive user interface may include providing information about the health of the fibers and fiber connections to allow a user to determine a root cause of the one or more issues. The one or more issues may include one or more of threshold crossing events, slow trends over time, and recent sudden change events. The process 170 may utilize a supervised Machine Learning (ML) technique to classify the one or more issues and may further utilize one or more of expert rules and labels provided by a network operator. The one or more issues of the fibers and fiber connections may include multiple issues, which may be prioritized. Also, the interactive user interface may be configured to display the multiple issues in the report to show the prioritization. Considering the detected issues and classification of the fibers and fiber connections, the process 170 may further include detecting a severity or importance of the one or more issues based on one or more of customer priorities, Service Level Agreements (SLAs), and feedback from previous results.

Network operators and other users who manage NOCs, data centers, etc. continue to look for proactive approaches to ensuring the performance and reliability of their optical network exceeds customer expectations. However, major parts of an optical network, which tend to cause issues for customers, are fibers and fiber connections. Therefore, instead of merely looking to fibers and fiber connections, the present disclosure is configured to help network operators better understand the fiber connection qualities and issues in their networks. The present disclosure can also provide results (e.g., on an interactive display) to help the network operators understand the health of the fiber connections, prioritize fiber component maintenance, as well as make routing/restoration decisions.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system comprising:
a network interface arranged in communication with a network for obtaining data associated with performance of a plurality of inter-node fibers and intra-node fibers and associated fiber connections;
an interactive user interface;
a processing device; and
a memory device configured to store computer logic having instructions that, when executed enable the processing device to
log the data obtained via the network interface over time in the memory device as historical data,
analyze health of the plurality of inter-node fibers and the intra-node fibers and the associated fiber connections, based on at least optical power measurements and Optical Time-Domain Reflectometry (OTDR) measurements from the historical data and immediate data newly obtained by the network interface, wherein analyzing the health of the fiber connections includes detecting one or more issues of the fiber connections and classifying the one or more issues as one of instantaneous issues and long-term issues,
display a report on the interactive user interface, the report configured to show the health of the plurality of inter-node fibers and the intra-node fibers and the associated fiber connections, and
cause one or more of maintenance and routing changes in the network based on the health.

2. The system of claim 1, wherein the fiber connections include the inter-node fibers between adjacent network nodes, the intra-node fibers within a network node, and associated connectors.

3. The system of claim 1, wherein the network interface is configured to obtain the data on a periodic basis.

4. The system of claim 1, wherein the data includes Performance Metric (PM) data, parameters, alarms, and topology data.

5. The system of claim 1, wherein the instructions further enable the processing device to determine baseline values, averages, minimums, maximums, and trends from the historical data.

6. The system of claim 1, wherein the instructions further enable the processing device to perform a risk assessment based on the health of the fiber connections.

7. The system of claim 1, wherein the instantaneous issues include any of a) fiber cuts, b) dirty fibers, c) dirty connectors, d) loosely connected fibers, e) pinched, bent, or kinked fibers, f) fibers being physically moved, and g) fiber being intruded, and
wherein the long-term issues include any of a) bad fiber repairs including splicing, b) manufacturing defects, c) abnormal fiber aging, d) addition of new malicious fibers, and e) addition of multiple splices over time.

8. The system of claim 1, wherein displaying the report on the interactive user interface includes providing comprehensive summary about the health of the fiber connections to allow a user to determine a root cause of the one or more issues.

9. The system of claim 1, wherein the one or more issues include one or more of threshold crossing events, slow trends over time, and recent sudden change events.

10. The system of claim 1, wherein the processing device is configured to utilize a supervised Machine Learning (ML) technique to classify the one or more issues.

11. The system of claim 1, wherein the instructions further enable the processing device to further utilize one or more of expert rules and labels provided by a network operator.

12. The system of claim 1, wherein the one or more issues of the fiber connections include multiple issues, and wherein the instructions further enable the processing device to prioritize the multiple issues and display the multiple issues in the report to show the prioritization.

13. The system of claim 1, wherein the data further includes one or more of Optical Return Loss (ORL), of Optical Supervisory Channel (OSC) delay measurements, Optical-channel Data Unit (ODU) delay measurements, Optical Power Received (OPR) variation, OSC loss, tide marking events, and alarm data.

14. A non-transitory computer-readable medium configured to store computer logic having instructions that, when executed, enable a processing device to:
obtain data associated with performance of a plurality of inter-node fibers and intra-node fibers and associated fiber connections of an optical network,
log the data over time as historical data,
analyze health of the plurality of the inter-node fibers and the intra-node fibers, and the associated fiber connections based on at least optical power measurements and Optical Time-Domain Reflectometry (OTDR) measurements from the historical data and newly-obtained data, wherein analyzing the health of the fiber connections includes detecting one or more issues of the fiber connections and classifying the one or more issues as one of instantaneous issues and long-term issues,
display a report on an interactive user interface, the report configured to show the health of the plurality of the inter-node fibers, the intra-node fibers, and the associated fiber connections, and
cause one or more of maintenance and routing changes in the optical network based on the health.

15. The non-transitory computer-readable medium of claim 14, wherein the fiber connections include the inter-node fibers between adjacent network nodes, the intra-node fibers within a network node, and associated connectors.

16. The non-transitory computer-readable medium of claim 14, wherein the data includes Performance Metric (PM) data, parameters, alarms, and metadata associated with all fiber connections in the network.

17. The non-transitory computer-readable medium of claim 14, wherein the instructions further enable the processing device to determine baseline values, averages, minimums, maximums, and trends from the historical data.

18. A method comprising the steps of:
obtaining data associated with performance of a plurality of inter-node fibers and intra-node fibers and associated fiber connections of an optical network,
logging the data over time as historical data,
analyzing health of the plurality of inter-node fibers and the intra-node fibers, and the associated fiber connections based on at least optical power measurements and Optical Time-Domain Reflectometry (OTDR) measurements from the historical data and newly-obtained data, wherein analyzing the health of the fiber connections includes detecting one or more issues of the fiber connections and classifying the one or more issues as one of instantaneous issues and long-term issues,
displaying a report on an interactive user interface, the report configured to show the health of the plurality of the inter-node fibers and the intra-node fibers, and the associated fiber connections;
causing one or more of maintenance and routing changes in the optical network based on the health.

19. The method of claim 18, wherein the step of analyzing the health of the fiber connections includes the step of detecting one or more issues of the fiber connections and classifying the one or more issues, and wherein the step of displaying the report on the interactive user interface includes providing information about the health of fiber connections to allow a user to determine a root cause of the one or more issues.

* * * * *